(12) United States Patent
Steen et al.

(10) Patent No.: US 10,768,085 B2
(45) Date of Patent: Sep. 8, 2020

(54) RESONANTLY-DRIVEN DROP CONTACT-LINE MOBILITY MEASUREMENT

(71) Applicant: CORNELL UNIVERSITY, Ithaca, NY (US)

(72) Inventors: Paul H. Steen, Ithaca, NY (US); Yi Xia, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 217 days.

(21) Appl. No.: 16/039,265

(22) Filed: Jul. 18, 2018

(65) Prior Publication Data
US 2019/0025177 A1 Jan. 24, 2019

Related U.S. Application Data

(60) Provisional application No. 62/534,147, filed on Jul. 18, 2017.

(51) Int. Cl.
*G01N 13/02* (2006.01)
(52) U.S. Cl.
CPC ..... *G01N 13/02* (2013.01); *G01N 2013/0208* (2013.01); *G06T 2207/20072* (2013.01)
(58) Field of Classification Search
CPC ........... G01N 13/02; G01N 2013/0208; G01N 2013/0283
See application file for complete search history.

(56) References Cited

U.S. PATENT DOCUMENTS 9,279,435 B2 * 3/2016 Bohringer ........... B01L 3/50273
10,525,472 B1 * 1/2020 Pandey ............ B01L 3/502792
(Continued)

FOREIGN PATENT DOCUMENTS

JP 2012032258 A 2/2012

OTHER PUBLICATIONS

Zhang Shi et al., "Dynamic contact angle hysteresis in liquid bridges," Colloids and Surfaces A: Physicochemical and Engineering Aspects, 555:365-371(2018) (Abstract only).
(Continued)

*Primary Examiner* — Nathaniel J Kolb
(74) *Attorney, Agent, or Firm* — FisherBroyles, LLP; Andrew K. Gonsalves, Esq.

(57) ABSTRACT

The present disclosure relates to, inter alia, systems and methods for measuring contact-line mobility of a liquid on a solid substrate. The system includes a motion-generation component, a motion-measurement component, and a computer component. The motion-generation component can include an actuator and a controller, the actuator being adapted to mount a solid substrate and effective to impart periodic forcing to the solid substrate when a test droplet of the liquid is deposited thereon, and the controller being adapted to tune frequency and amplitude of the forcing to induce measurable contact-line displacement of the test droplet on the solid substrate. The motion-measurement component includes an image acquisition device adapted for capturing images of the test droplet. The image acquisition device has requisite spatial and temporal resolution to enable acquisition of image data of the test droplet, the image data including contact-line displacement, contact-line speed, and contact angle at or near contact-line.

25 Claims, 5 Drawing Sheets

(56) References Cited

U.S. PATENT DOCUMENTS

| | | | | |
|---|---|---|---|---|
| 2010/0024529 A1* | 2/2010 | Dillingham | ............ | G01N 13/02 |
| | | | | 73/64.52 |
| 2014/0144518 A1* | 5/2014 | Bohringer | ................ | F15D 1/00 |
| | | | | 137/13 |
| 2019/0022655 A1* | 1/2019 | Holmes | ............ | B01L 3/502792 |

OTHER PUBLICATIONS

Hun Kim et al., "Mode pattern of internal flow in a water droplet on a vibrating hydrophobic surface," J. Physical Chemistry, 119(22):6740-6746 (2015) (Abstract only).

Robert H. Temperton, "Resonant vibrations of microlitre liquid drops," Thesis submitted to the University of Nottingham for the degree of Master of Science (by Research), 116 pages, The University of Nottingham (2012).

James S. Sharp et al., "Contact angle dependence of the resonant frequency of sessile water droplets," Langmuir, 27 (15):9367-9371 (2011) (Abstract only).

Srinivas Mettu et al., "Motion of Liquid Drops on Surfaces Induced by Asymmetric Vibration: Role of Contact Angle Hysteresis," Langmuir, 27(16):10327-10333 (2011) (Abstract only).

Paolo Sartori et al., "Drop motion induced by vertical vibrations," New Journal of Physics, 17:113017:1-15 (2015).

Xavier Noblin et al., "Vibrations of sessile drops," Eur. Phys. J. Special Topics, 166:7-10 (2009).

Aditi Chakrabarti et al., "Vibrations of sessile drops of soft hydrogels," Extreme Mechanics Letters, 1:47-53 (2014).

Susan Daniel et al., "Vibration-Actuated Drop Motion on Surfaces for Batch Microfluidic Processes," Langmuir 21:4240-4248 (2005).

Yi Xia and Paul H. Steen, "Moving contact-line mobility measured," J. Fluid Mech. 841:767-783 (2018).

* cited by examiner

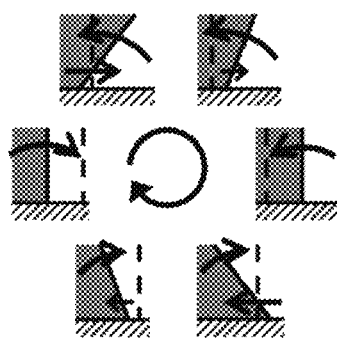
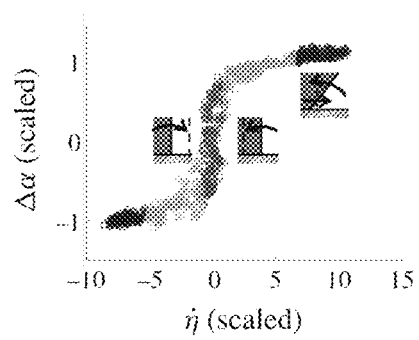
FIG. 4A             FIG. 4B
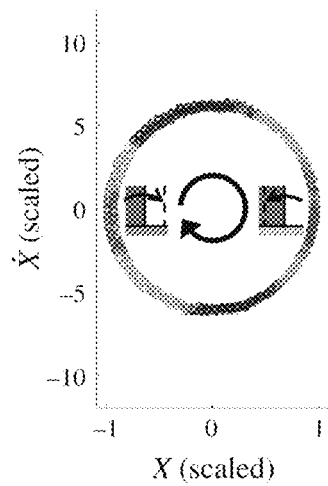
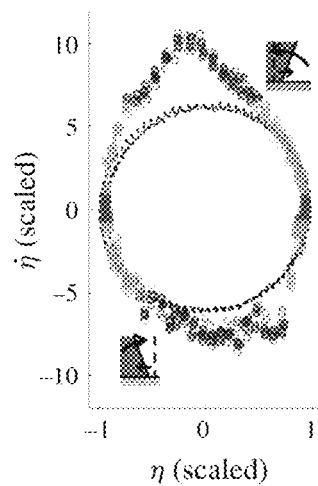
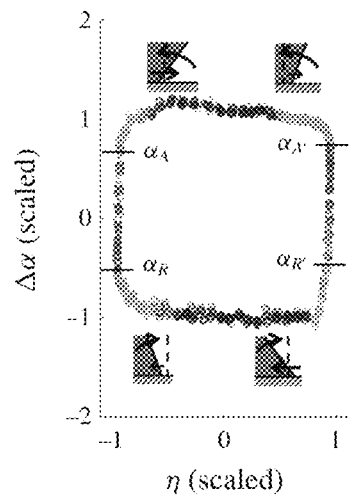
FIG. 4C         FIG. 4D         FIG. 4E
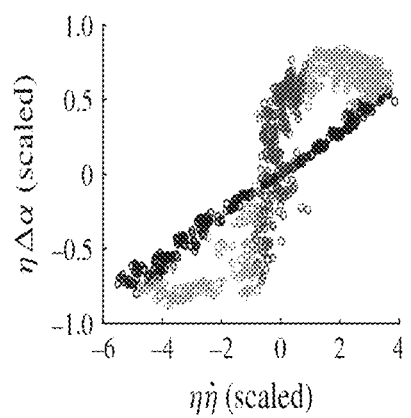
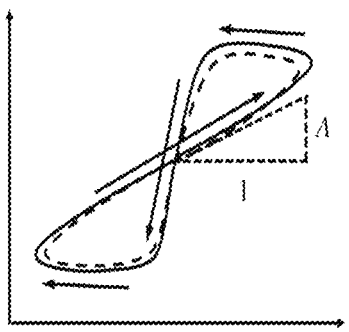
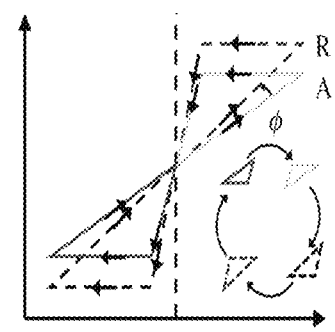
FIG. 5A         FIG. 5B         FIG. 5C

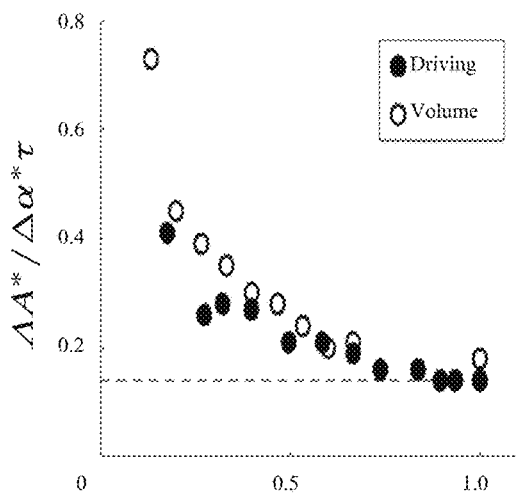
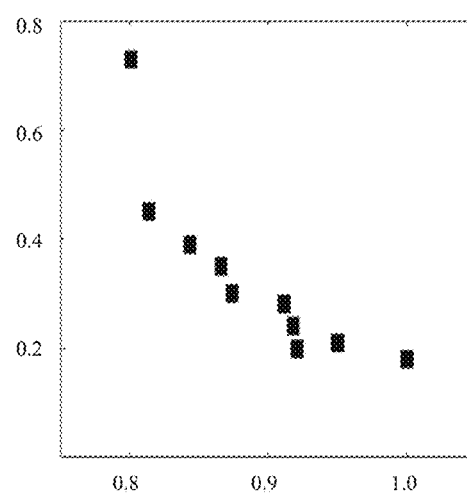
*FIG. 6A*  *FIG. 6B*
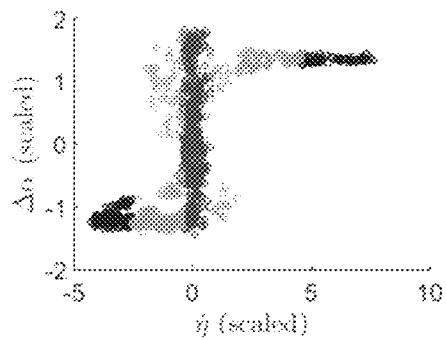
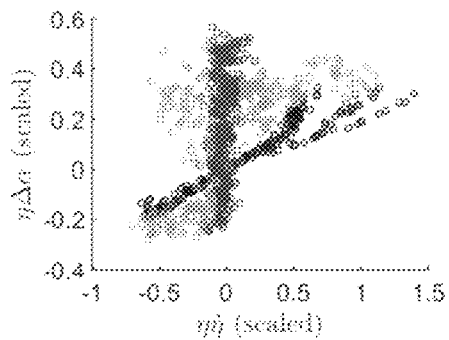
*FIG. 7A*  *FIG. 7B*
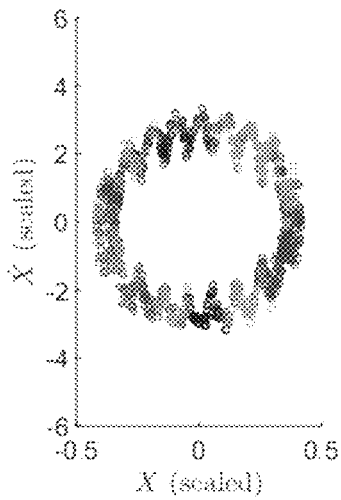
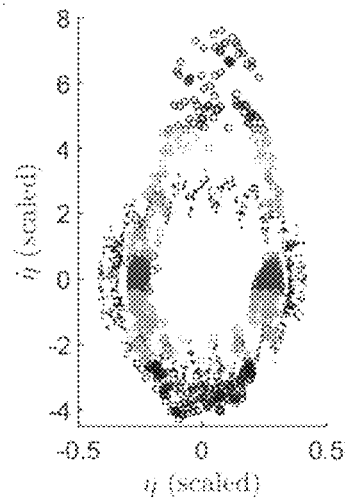
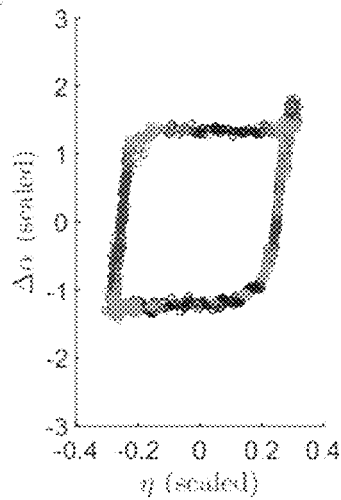
*FIG. 7C*  *FIG. 7D*  *FIG. 7E*

US 10,768,085 B2

RESONANTLY-DRIVEN DROP CONTACT-LINE MOBILITY MEASUREMENT

CROSS-REFERENCE TO RELATED APPLICATIONS

This application claims priority benefit of U.S. Provisional Patent Application Ser. No. 62/534,147, filed Jul. 18, 2017, the disclosure of which is hereby incorporated by reference herein in its entirety.

STATEMENT REGARDING FEDERALLY SPONSORED RESEARCH

This invention was made with Government support under Grant Numbers 1236582 and 1637960 awarded by the National Science Foundation. The Government has certain rights in the invention.

FIELD OF THE INVENTION

The present invention relates to, inter alia, systems and methods for measuring contact-line mobility of inertially spreading liquids.

BACKGROUND OF THE INVENTION

Contact-line mobility characterizes how fast a liquid can coat or uncoat a substrate support. During rapid movement of liquid across a supporting substrate, contact angles and contact line speeds change dynamically. Mobility captures this far-from-equilibrium behavior. For sufficiently rapid movement, the flow is largely inviscid and surface tension and liquid inertia compete to influence the interface shape near the support.

While standard goniometry techniques address the issue of determining the static contact angle and the contact angle hysteresis of a substrate-liquid-gas system, there is no current standard for measuring the mobility of the contact line in terms of the velocity dependence of the contact angle.

There is a need for new and improved technologies for measuring contact-line mobility of inertially spreading liquids.

The present invention is directed to overcoming these and other deficiencies in the art.

SUMMARY OF THE INVENTION

The present disclosure relates to, inter alia, systems and methods for measuring contact-line mobility of a liquid on a solid substrate.

In one aspect, the present disclosure provides a system for measuring contact-line mobility of a liquid on a solid substrate, where the system includes: (a) a motion-generation component; (b) a motion-measurement component; and (c) a computer component. The motion-generation component of the present system includes an actuator and a controller, where (i) the actuator is adapted to mount a solid substrate, and effective to impart periodic forcing to the solid substrate when a test droplet of the liquid is deposited thereon; and (ii) the controller is adapted to tune frequency and amplitude of the forcing to induce measurable contact-line displacement of the test droplet on the solid substrate. The motion-measurement component of the present system includes an image acquisition device adapted for capturing images of the test droplet deposited on the solid substrate before, during and/or after the forcing imparted by the actuator. Furthermore, the image acquisition device has requisite spatial and temporal resolution to enable acquisition of image data of the test droplet, where the image data includes contact-line displacement, contact-line speed, and contact angle at or near contact-line. The computer component of the present system is adapted to receive and analyze the image data from the motion-measurement component effective to measure the contact-line mobility of the test droplet.

In another aspect, the present disclosure provides a method for measuring contact-line mobility of a liquid on a solid substrate. The method includes the steps of: (a) subjecting test droplets of the liquid on the solid substrate to periodic forcing to induce measurable contact-line displacement; (b) acquiring image data of the test droplets comprising contact-line displacement, contact-line speed, and contact angle at or near contact-line thereof; and (c) determining Contact-Line Drag Coefficient M from the image data by generating a contact-line cyclic diagram. The contact-line cyclic diagram includes a plot of $\eta \Delta \alpha$ versus $\eta \dot{\eta}$, where $\eta$=contact line displacement, $\dot{\eta}$=contact-line speed, and $\Delta \alpha$=contact angle deviation. The contact-line cyclic diagram include also includes an advancing loop A having a linear region A and a receding loop R having a linear region R simultaneously, where the Contact-Line Drag Coefficient M is a reciprocal slope of a best fit line through linear region A and linear region R.

In another aspect, the present disclosure provides a further method for measuring contact-line mobility of a liquid on a solid substrate. This method includes the steps of: (a) providing a system for measuring contact-line mobility of a liquid on a solid substrate, where the system includes a motion-generation component, a motion-measurement component, and a computer component adapted to receive and analyze the image data from the motion-measurement component; (b) depositing one or more test droplet of the liquid onto the solid substrate; and (c) operating the system in a manner effective to determine the Contact-Line Drag Coefficient M of the liquid. The motion-generation component of the system includes an actuator and a controller. The actuator is adapted to mount a solid substrate thereon, and effective to impart periodic forcing to the solid substrate when a test droplet of the liquid is deposited thereon. The controller is adapted to tune frequency and amplitude of the forcing to induce measurable contact-line displacement of the test droplet on the solid substrate. The motion-measurement component includes an image acquisition device adapted for capturing images of the test droplet deposited on the solid substrate before, during, and/or after the forcing imparted by the actuator. The image acquisition device has requisite spatial and temporal resolution to enable acquisition of image data of the test droplet comprising contact-line displacement, contact-line speed, and contact angle at or near contact-line. The computer component is configured to determine a dimensionless parameter of contact-line mobility of the liquid from the image data, where the dimensionless contact-line mobility parameter is Contact-Line Drag Coefficient M.

Some advantages of the system and methods of the present disclosure include, for example, those described below. For example, the system and methods of the present disclosure implement key innovations involving combining contact-line (CL) displacement, CL speed, and contact angle (CA) data in a way to reveal linearity (see FIGS. 5A-5C) and identifying the linearity as relating to the "wing regions" of a traditional diagram (see FIGS. 1B, 2C, and 4B). The innovation of the present disclosure that enables the step from FIGS. 4A-4E to FIGS. 5A-5C is highly innovative and new, in that CL displacement, CL speed, and CA can be combined to reveal linearity.

Wing regions data represent behavior far from stick-slip region. This is dynamical behavior, far from equilibrium. One major innovative contribution of the present disclosure is revealing how to characterize this far-from-equilibrium behavior (see FIGS. 5A-5C) and identifying it as a far-from-equilibrium characterization (FIG. 4B, wing data). The use of resonant-mode frequencies to drive the moving contact line (CL) facilitates the systems and methods of CL mobility measurement of the present disclosure. It is believed that this is the first time this has been done. For example, until the present disclosure, there is a lack of reports in the art involving the characterization of far-from-equilibrium CL behavior that involves a single measurement, which is termed "CL mobility" herein.

The present disclosure provides various advantages, including, without limitation: (i) identifying that there exists a linear region in a contact-line cyclic diagram for CL mobility; (ii) showing how to combine measurements of CL displacement, CL speed, and CA to reveal that linear region; (iii) showing that there are limits to that region of linearity (the wing regions), that are not obvious in the traditional diagram (TD) (see FIG. 4B); and (iv) characterizing that region by a single number, which in certain embodiments is referred to in the present disclosure as CL mobility, the CL drag coefficient, or the Contact-Line Drag Coefficient M. Another way of expressing this terminology is as CL mobility, as defined and measured in herein, which carries the specific role of being a parameter in the constitutive relation that allows CL speed and contact angle (CA) to be predicted from each other.

Incidentally, the systems and methods of the present disclosure enable a broad set of industrial applications, as disclosed herein.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, if provided, like reference numerals contained in the drawings are meant to identify similar or identical elements.

FIG. 1A is a diagram illustrating a reference drop configuration (dashed), having reference contact angle $\bar{\alpha}$ (see Example 1, § 6), is disturbed to new shape (filled) with new angle $\alpha \equiv \bar{\alpha} + \Delta\alpha$, while the contact line is displaced a distance FIG. 1B is a diagram illustrating CL behaviour reported in the traditional diagram (TD), $\Delta\alpha$ versus $U_{CL} \equiv d\eta/dt$, after Dussan (1979). Shorthand for $\Delta\alpha_A$ is $\alpha_A$, and so forth.

FIG. 2A illustrates a set-up of a system of the present disclosure, showing that a signal drives shaker as HS camera images dynamic shapes for analysis. FIG. 2B illustrates that platform support oscillates with amplitude A to drive drop of density $\rho$, dynamic viscosity $\mu$ and surface tension $\sigma$, $X(t)=A \sin(2\pi f t)$. FIG. 2C illustrates CL response in TD, for three accelerations a, system M00.

FIG. 3A illustrates selected mode shapes resulting from excitation: photos (top) from experiment and rendered (bottom) from theory; the mode [2, 0] (boxed) is excited as set forth in the Examples section; drop footprint radius ≈2.5 mm (Bostwick & Steen 2014; Chang et al. 2015). FIG. 3B illustrates response of a 20 μl drop to frequency scan excitation where |Y/X| is normalized drop apex response. Inset: shape extremes (superimposed), platform displacement X and drop apex displacement Y. X and Y are measured in laboratory frame. System M00.

FIGS. 4A-4E are schematics and diagrams illustrating aspects of the motion of contact-line in response to cyclic excitation and various plots. FIG. 4A are sketches of CL position, CA tangent and directions-of-change (doc): vertical dashed line indicates CL rest position and CA rest tangent; straight arrows represent doc of CL, curved arrows, doc of CA; clockwise time (centre arrow). FIG. 4B is a traditional diagram (TD), data coloured by stick, shoulder and wing region. FIG. 4C illustrates platform phase plane: clockwise time. FIG. 4D illustrates CL phase plane: $\eta$ versus $\dot{\eta}$ (coloured), $\dot{X}$ versus $X$ (black) from FIG. 4C, for reference. FIG. 4E is a CA versus CL diagram. All plots have the same scales: length $A^*\equiv 0.1$ mm; time $\tau^*=0.17$ s; angles $\Delta\alpha^*=10°$. 12 cycles. M00 system.

FIGS. 5A-5C illustrate aspects of a contact-line diagram according to one embodiment of the present disclosure. FIG. 5A is a re-plot of data from FIG. 4B for the M00 system, axes weighted by $\eta$ (scales and colours as in FIGS. 4B-4E). FIG. 5B is a cyclic diagram schematic, the double-loop features one traverse (solid) followed by a second (dotted), time indicated by arrows. FIG. 5C is a diagram illustrating CA balancing: $\alpha$ fit to minimize angle $\varphi$ between advancing (A) and receding (R) loops; inset: visiting sequence of coloured triangles.

FIGS. 6A-6B are diagrams illustrating measured values of $\Lambda$ at varying driving acceleration and drop sizes for the M00 system discussed in the Examples section. FIG. 6A illustrates $\Lambda$ versus acceleration a, drop volume V, all scaled. System M00. Scales: $a_{max}=15.3$ m s$^{-2}$ for 20 μl drop; $V_{max}=30$ μl. Horizontal line has y-intercept at 0.14, cf. Table 5. FIG. 6B illustrates scaled $\Lambda$ versus scaled boundary layer thickness d≡δ/D, $d_{min}=0.018$, system M00, for 20 μl drop. Note that here, τ, which appears in the $\Lambda$ scale, depends on V, in contrast to Table 5, where $\tau^*$ is fixed.

FIGS. 7A-7E are diagrams illustrating graphical plots corresponding to FIGS. 4B-4E and 5A for the M00 system discussed in the Examples section. FIG. 7A is a plot of CA-$U_{CL}$ relationship for F00 system. V=20 μL, f=66 Hz, A=0.04 mm. 13 cycles. FIG. 7B illustrates CLCD in the style of FIG. 5A for F00. FIG. 7C illustrates phase plane of support displacement X. FIG. 7D illustrates phase plane of $\eta$ (coloured circles) and of X (black dots), for reference. FIG. 7E illustrates plots of $\Delta\alpha$ against $\eta$. Scales as in FIGS. 4B-4E.

DETAILED DESCRIPTION OF THE INVENTION

The present invention relates to, inter alia, systems and methods for measuring contact-line mobility of inertially spreading liquids. The systems and methods can be used in various ways, including, without limitation, for material characterization for application in forensic examination of blood splats, inkjet printing, additive manufacturing, and immersion lithography, just to name some.

Resonantly-Driven Droplets (RDD) allow measurement of an important property of rapidly moving contact-lines-the mobility. The mobility is a measure of how fast the contact line moves per deviation of the contact-angle from the equilibrium contact-angle. It is a dynamical characterization of how liquids move across supporting substrates. In RDD, the bulk resonance of the drop amplifies the small and fast CL motion sufficiently to be measurable. The RDD approach enables measurement of a CL mobility and to infer a CL dissipation for droplets on hydrophobic and hydrophilic surfaces, surfaces with varying contact-angle hysteresis. Rapid spreading is important in many industrial, manufacturing and natural settings. Mobility is a non-equilibrium characterization that complements conventional static contact angle and contact angle hysteresis measurements (advancing and receding contact angles). The present disclosure is directed to aspects relating to RDD.

The systems and methods of the present disclosure provide various advantages over the state of the art relating to mobility measurements of liquids. Examples of just some of the advantages include, without limitation, the following: (i) speed (e.g., time required for data collection is on the order of a tenth of a second; (ii) reproducibility (e.g., periodic nature of setup allows repeat measurements to be taken in rapid succession); and (iii) robustness (e.g., results insensitive to details of the operating parameters).

Systems for Measuring Contact-Line Mobility

Figure 2A:
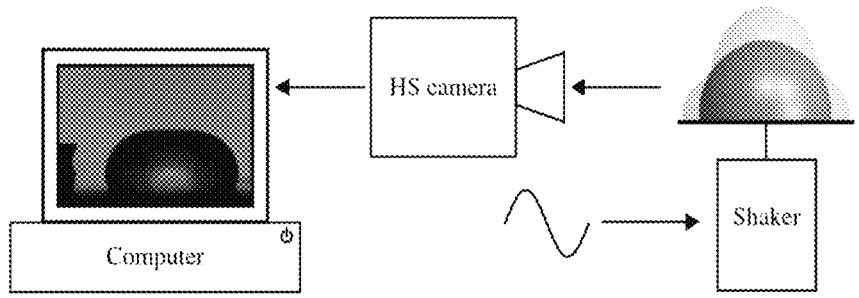
FIGS. 2A-2C are diagrams illustrating aspects of one embodiment of a system for measuring contact-line mobility of the present disclosure.

In one aspect, the present disclosure provides a system for measuring contact-line mobility of a liquid on a solid substrate, where the system includes: (a) a motion-generation component; (b) a motion-measurement component; and (c) a computer component. An illustrative example of one embodiment of the system of the present disclosure is schematically shown in FIG. 2A, where the motion-generation component is depicted as a shaker, the motion-measurement component is depicted as an HS camera (high-speed camera), and the computer component is depicted as a computer.

The motion-generation component of the present system includes an actuator and a controller, where (i) the actuator is adapted to mount a solid substrate, and effective to impart periodic forcing to the solid substrate when a test droplet of the liquid is deposited thereon; and (ii) the controller is adapted to tune frequency and amplitude of the forcing to induce measurable contact-line displacement of the test droplet on the solid substrate.

The motion-measurement component of the present system includes an image acquisition device adapted for capturing images of the test droplet deposited on the solid substrate before, during and/or after the forcing imparted by the actuator. Furthermore, the image acquisition device has requisite spatial and temporal resolution to enable acquisition of image data of the test droplet.

As used herein, the term "image data" of the test droplet includes contact-line displacement, contact-line speed, and contact angle at or near contact-line.

The computer component of the present system is adapted to receive and analyze the image data from the motion-measurement component effective to measure the contact-line mobility of the test droplet.

In one embodiment of the system, the computer component is configured to determine a dimensionless parameter of contact-line mobility of the liquid from the image data. The dimensionless contact-line mobility parameter is referred to herein as the Contact-Line Drag Coefficient M.

As used herein, the "Contact-Line Drag Coefficient M" is determined from the image data by generating a contact-line cyclic diagram that includes a plot of $\eta\Delta\alpha$ versus $\eta\dot{\eta}$, where $\eta$=contact line displacement, $\dot{\eta}$=contact-line speed, and $\Delta\alpha$=contact angle deviation. The contact-line cyclic diagram includes an advancing loop A having a linear region A and a receding loop R having a linear region R simultaneously, where the Contact-Line Drag Coefficient M is a reciprocal slope of a best fit line through linear region A and linear region R. In certain embodiments, the contact-line cyclic diagram is generated using a contact angle balancing computation that involves minimizing angle $\varphi$ over reference contact angle $\bar{\alpha}$, where angle $\varphi$ is the angle between linear region A and linear region R, and where reference contact angle $\bar{\alpha}$ is left as a free parameter. An example of a contact-line cyclic diagram of the present disclosure is found in FIG. 5C.

In one embodiment of the system of the present disclosure, the motion-generation component is configured to create inertial-capillary motions in bulk accompanied by contact-line motion sufficient to enable contact-line displacement, contact-line speed, and contact angle at or near contact-line to be measured by the motion-measurement component, with requisite spatial and temporal resolution. In a particular embodiment, the contact-line motion is periodic motion.

In one embodiment of the system of the present disclosure, the motion-generation component is configured to induce periodic forcing of the test droplets by substantially plane-normal motion of the solid substrate.

In one embodiment, the actuator is a mechanical shaker device.

In one embodiment, the controller is a function generator for controlling plane-normal vibration parameters of the actuator.

In one embodiment of the system of the present disclosure, the image acquisition device is adapted for capturing different views of the images of the test droplet. The different views of the images can include one or more top view, bottom view, side view, or combination of top views, bottom views, or side views. As used herein, a side view encompasses all angles of views of the test droplet that are not the top or bottom view thereof.

In one embodiment, the image acquisition device is a high-speed camera.

In one embodiment, the image acquisition device is effective to capture high-speed images of the test droplet at frame rates including, but not limited to, a range of about 2000-5000 Hz, including any frame rates in between this range.

In other embodiments, the system of the present disclosure can further include a liquid dispensing component configured to dispense one or more test droplets onto the solid substrate during functioning of the system. The liquid dispensing component can include, without limitation, any device or system that can dispense the liquid test droplets in any manner and volume effective for the intended operation of the systems and methods of the present disclosure including, for example, devices and systems that operate in a manual, automated, robotic, computerized, or other suitable fashion. One suitable example of a liquid dispensing component can include, without limitation, a microsyringe, including a manually or automatically operated microsyringe or a plurality of microsyringes.

As used herein, the "solid substrate" can include any solid material that is a solid substrate. As used as a part of a system of the present disclosure or in a method of the present disclosure, a solid substrate can be any solid material in any form and in any orientation suitable to enable measurement of a liquid's contact-line displacement, contact-line speed, and contact angle at or near contact-line by an image acquisition device of the present disclosure with the requisite spatial and temporal resolution as described herein. Without intending to be limited thereby, provided below are suitable examples of various solid substrates of the present disclosure. In one embodiment, the solid substrate is a substantially planar solid substrate. In one embodiment, the solid substrate can be horizontally oriented, vertically oriented, or oriented in any other plane between the horizontal and vertical orientations. In one embodiment, the solid substrate can be in the form of a platform, including, without limitation, a platform mounted on the motion-generation component of the present disclosure or more specifically mounted on the actuator of the motion-generation component. In one embodiment, the solid substrate can include, without limitation, a smooth and hydrophobic material. In one embodiment, the solid substrate can include, without limitation, silicon, glass, mica, or metal. In one embodiment, the solid substrate is in the form of a silicon wafer, a glass wafer, or a freshly cleaved mica. In one embodiment, the solid substrate is in the form of a polished and hydrophobic silicon or glass wafer, or similarly prepared metal. In one embodiment, the surface of the solid substrate is treated to have a low-hysteresis (LH) surface. In one embodiment, the surface of the solid substrate is either hydrophobic, hydrophilic, or a combination thereof. In one embodiment, the coating/uncoating of the solid substrate can occur, without limitation, on a gel or other material.

Methods for Measuring Contact-Line Mobility

In another aspect, the present disclosure provides a method for measuring contact-line mobility of a liquid on a solid substrate. The method includes the steps of: (a) subjecting test droplets of the liquid on the solid substrate to periodic forcing to induce measurable contact-line displacement; (b) acquiring image data of the test droplets comprising contact-line displacement, contact-line speed, and contact angle at or near contact-line thereof; and (c) determining Contact-Line Drag Coefficient M from the image data by generating a contact-line cyclic diagram. The contact-line cyclic diagram includes a plot of $\eta\Delta\alpha$ versus $\eta\dot{\eta}$, where $\eta$=contact line displacement, $\dot{\eta}$=contact-line speed, and $\Delta\alpha$=contact angle deviation. The contact-line cyclic diagram include also includes an advancing loop A having a linear region A and a receding loop R having a linear region R simultaneously, where the Contact-Line Drag Coefficient M is a reciprocal slope of a best fit line through linear region A and linear region R.

Although specific embodiments of the method are described below, the systems described herein and the components of those systems can all be used to implement the methods of the present disclosure described in more detail below. Therefore, the disclosures of certain embodiments of the method described below are not meant to be limiting on the systems and components that can be used to perform the method.

In one embodiment of this method, the contact-line cyclic diagram is generated using a contact angle balancing computation comprising minimizing angle $\varphi$ over reference contact angle $\bar{\alpha}$, where angle $\varphi$ is the angle between linear region A and linear region R, and where reference contact angle $\bar{\alpha}$ is left as a free parameter.

In one embodiment of this method, the subjecting step (a) involves subjecting the test droplets on the solid substrate to inertial-capillary motions in bulk, and accompanied by contact-line motion, under conditions sufficient to enable contact-line displacement, contact-line speed, and contact angle at or near contact-line to be measured by an image acquisition device with requisite spatial and temporal resolution.

The method is suitable for measuring contact-line mobility of any liquid, including, without limitation, a liquid such as a blood sample, an ink sample, a drop-on-demand printing liquid sample, a 3D printing liquid sample, an additive doped liquid sample, an immersion lithography liquid sample, a spin-coating liquid sample, a soldering liquid sample, a brazing liquid sample, and a lubricant liquid sample.

In another aspect, the present disclosure provides a further method for measuring contact-line mobility of a liquid on a solid substrate. This method includes the steps of: (a) providing a system for measuring contact-line mobility of a liquid on a solid substrate of the present disclosure; (b) depositing one or more test droplet of the liquid onto the solid substrate; and (c) operating the system in a manner effective to determine the Contact-Line Drag Coefficient M of the liquid.

In accordance with this method, the system used in this method includes the system described in the present disclosure. In particular, the system used in this method includes a motion-generation component, a motion-measurement component, and a computer component adapted to receive and analyze the image data from the motion-measurement component.

The motion-generation component of the system includes an actuator and a controller. The actuator is adapted to mount a solid substrate thereon, and effective to impart periodic forcing to the solid substrate when a test droplet of the liquid is deposited thereon. The controller is adapted to tune frequency and amplitude of the forcing to induce measurable contact-line displacement of the test droplet on the solid substrate.

The motion-measurement component includes an image acquisition device adapted for capturing images of the test droplet deposited on the solid substrate before, during, and/or after the forcing imparted by the actuator. The image acquisition device has requisite spatial and temporal resolution to enable acquisition of image data of the test droplet comprising contact-line displacement, contact-line speed, and contact angle at or near contact-line.

The computer component is configured to determine a dimensionless parameter of contact-line mobility of the liquid from the image data, where the dimensionless contact-line mobility parameter is Contact-Line Drag Coefficient M.

In accordance with this method, in one embodiment, the Contact-Line Drag Coefficient M is determined from the image data by generating a contact-line cyclic diagram that includes a plot of $\eta\Delta\alpha$ versus $\eta\dot{\eta}$, wherein $\eta$=contact line displacement, $\dot{\eta}$=contact-line speed, and $\Delta\alpha$=contact angle deviation. The contact-line cyclic diagram includes an advancing loop A having a linear region A and a receding loop R having a linear region R simultaneously, where the Contact-Line Drag Coefficient M is a reciprocal slope of a best fit line through linear region A and linear region R.

In accordance with this method, in one embodiment, the contact-line cyclic diagram is generated using a contact angle balancing computation that involves minimizing angle φ over reference contact angle $\bar{\alpha}$, where angle φ is the angle between linear region A and linear region R, and where reference contact angle $\bar{\alpha}$ is left as a free parameter.

In accordance with this method, in one embodiment, the motion-generation component is configured to create inertial-capillary motions in bulk accompanied by contact-line motion sufficient to enable contact-line displacement, contact-line speed, and contact angle at or near contact-line to be measured by the motion-measurement component, with requisite spatial and temporal resolution.

In one embodiment, the contact-line motion is periodic motion.

In accordance with this method, in one embodiment, the motion-generation component is configured to induce periodic forcing of the test droplets by substantially plane-normal motion of the solid substrate.

In one embodiment, the actuator includes, without limitation, a mechanical shaker device.

In one embodiment, the controller includes, without limitation, a function generator for controlling plane-normal vibration parameters of the actuator.

In accordance with this method, in one embodiment, the image acquisition device is adapted for capturing different views of the images of the test droplet. The different views of the images can include one or more top view, bottom view, side view, or combination of top views, bottom views, or side views. As used herein, a side view encompasses all angles of views of the test droplet that are not the top or bottom view thereof.

In one embodiment of this method, the image acquisition device is a high-speed camera.

In other embodiments of this method, the one or more test droplet is dispensed onto the solid substrate by a liquid dispensing component of the system. Suitable examples of liquid dispensing component can include, without limitation, a manual microsyringe. However, the method can involve any other liquid dispensing component as described herein.

This method is suitable for measuring contact-line mobility of any liquid, including, without limitation, a liquid such as a blood sample, an ink sample, a drop-on-demand printing liquid sample, a 3D printing liquid sample, an additive doped liquid sample, an immersion lithography liquid sample, a spin-coating liquid sample, a soldering liquid sample, a brazing liquid sample, and a lubricant liquid sample.

In accordance with the methods of the present disclosure, in one embodiment, the resonant frequency of the test droplet is determined by analyzing high-speed side-view profile images of the test droplet while a shaker device is signaled by the function generator to drive the test droplet in a plane-normal direction through mechanical vibrations.

In certain embodiments, the test droplet volume can be, without limitation, as large as possible (so as to reduce errors, if any, with optical measurements) without the droplet flattening into a puddle (which will inevitably happen with large enough volumes due to gravity).

In accordance with the systems and methods of the present disclosure, the hardware used for the system can include, without limitation, a mechanical shaker capable of receiving an input signal from a function generator as well as a high-speed image acquisition device. In certain embodiments, to make a measurement, the solid substrate in question is securely attached to the shaker with a small (under capillary length scale) drop of the liquid of interest deposited on the substrate. The shaker is made to undergo a frequency sweep to select the resonant frequency of the drop, at which the data acquisition will commence for several periods of oscillation at that constant frequency. With the image data collected, basic image analysis allows the evaluation of the contact line mobility parameter.

During the use of the systems and methods of the present disclosure, it is recognized that in certain instances mobility can be affected by the solid substrate as well as the liquid that is being coated or uncoated. For example, changing the solid substrate chemically or mechanically (e.g., roughening) or by some other means can change mobility.

These and other objects, features, and advantages of this invention will become apparent from the following detailed description of the various aspects of the invention taken in conjunction with the accompanying drawings.

Provided below is further disclosure with regard to the background, detailed description, and various embodiments and examples relating to the present invention.

EXAMPLES

The following examples are intended to illustrate particular embodiments of the present invention, but are by no means intended to limit the scope of the present invention.

Example 1

Moving Contact-Line Mobility Measured

Abstract

Contact-line mobility characterizes how fast a liquid can wet or unwet a solid support by relating the contact angle $\Delta\alpha$ to the contact-line speed $U_{CL}$. The contact angle changes dynamically with contact-line speeds during rapid movement of liquid across a solid. Speeds beyond the region of stick-slip are the focus of this experimental paper. For these speeds, liquid inertia and surface tension compete while damping is weak. The mobility parameter M is defined empirically as the proportionality, when it exists, between $\Delta\alpha$ and $U_{CL}$, $M\Delta\alpha=U_{CL}$. We discover that M exists and measure it. The experimental approach is to drive the contact line of a sessile drop by a plane-normal oscillation of the drop's support. Contact angles, displacements and speeds of the contact line are measured. To unmask the mobility away from stick-slip, the diagram of $\Delta\alpha$ against $U_{CL}$, the traditional diagram, is remapped to a new diagram by rescaling with displacement. This new diagram reveals a regime where $\Delta\alpha$ is proportional to $U_{CL}$ and the slope yields the mobility M. The experimental approach reported introduces the cyclically dynamic contact angle goniometer. The concept and method of the goniometer are illustrated with data mappings for water on a low-hysteresis non-wetting substrate.

1. Introduction

The liquid/solid/gas contact line (CL) marks the boundary between wet and unwet support. A liquid advances along a support by displacing the surrounding gas. Alternatively, if the liquid retreats it may unwet the previously wet support, in which case gas replaces liquid. For CLs moving at high enough speeds, $U_{CL}$, the contact-line motion is dominated by liquid inertia and capillarity. Rapidly advancing and retreating CL motions are relevant to a broad range of technological phenomena, from satellite propellant management (Srinivasan 2003) to harvesting energy through liquid metal CL motions (Krupenkin & Taylor 2011) to the immersion lithography approach to fabrication of semiconductor chips (Gnanappa et al. 2011).

In this example, we show experimentally that a single characterization of inertial spreading can be extracted from the cyclic measurements of rapid wetting and de-wetting. This lays the foundation for characterizing inertial-capillary spreading as a material-like parameter for liquid/solid/gas triplets. This possibility and the further work needed to realize this goal are discussed.

Practically speaking, a signature of inertial-capillary motions is underdamped vibrations. Water and liquid metal drops are important examples that exhibit underdamped motions. We choose water as liquid for our benchmark system. We use a slightly hydrophobic support with low hysteresis. In summary, inertial-capillary motion on a solid support is favoured by liquids that do not strongly wet that support and that have low bulk viscosity.

Figure 1A:
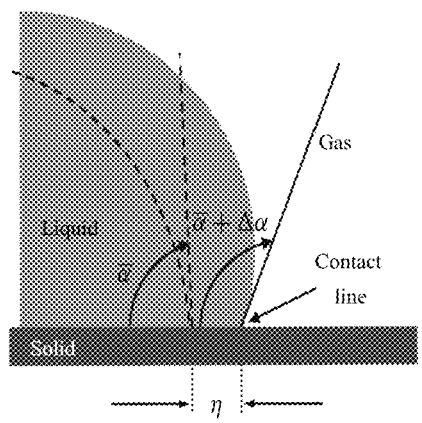
FIGS. 1A-1B are diagrams illustrating aspects relating to contact angle, contact-line and traditional contact-line behavior.

When disturbed from a reference configuration, the CL and contact angle (CA) will deviate by a displacement $\eta$ and an angle $\Delta\alpha$, respectively, FIG. 1A. Moving CL behaviour has been traditionally reported as $\Delta\alpha$ versus $U_{CL}$, FIG. 1B, which we refer to as the traditional diagram (TD). According to FIG. 1B, starting from the reference configuration, $\Delta\alpha=0$, the CL begins to advance (A) or recede (R) at angles $\alpha_A$ ($\Delta\alpha_A$) and $\alpha_R(\Delta\alpha_R)$. Slightly different values are obtained by slowing to the reference configuration, denoted $\alpha_{A'}$ and $\alpha_{R'}$, respectively, indicating hysteresis. Our study cyclically forces a drop and uses high-speed imaging to obtain time series of $U_{CL}$, $\Delta\alpha$ and $\eta$. Plotting $\Delta\alpha$ against $U_{CL}$ results in a figure like FIG. 1B. This serves as a familiar starting point for the reader. We then plot the same triplet of data in a number of different diagrams which reveals surprising features of the cyclic measurements.

Figure 1B:
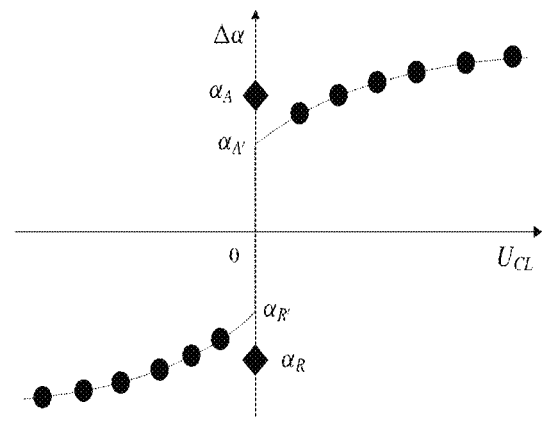
Figure 2B:
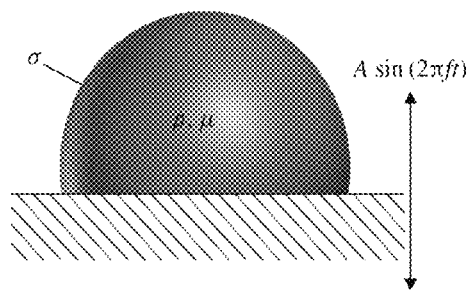
Figure 2C:
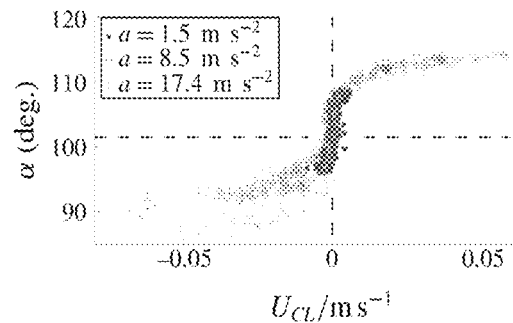

Our experimental set-up includes a droplet shaker and high-speed camera to image the contact-line region for subsequent analysis by computer, FIG. 2A. The support plate is mechanically oscillated at frequency f with laboratory frame plate-normal displacement $X(t)=A \sin(2\pi ft)$ to yield peak plate accelerations $a=\pm A(2\pi f)^2$, where A is the forcing amplitude and t the time, FIG. 2B. The CL response of water so-generated is shown in the traditional diagram, FIG. 2C. Note that the classical sigmoidal shape of FIG. 1B is reproduced. For a 10-fold range of accelerations, the data reasonably collapse. Greater spread of data for the receding as compared to the advancing CL regime is consistent with prior observations (Elliott & Riddiford 1967). Our interest is in the regions away from the stationary CL, where CA multiplicity occurs, since these are the regions of high CL speeds.

Large CL excursions are favoured by low viscosity liquids on low-hysteresis coatings. Such liquids tend to have neutral affinity for the support; that is, a CA near 90°. Our benchmark system for this study is water on a silicon wafer treated with a silane coating to achieve a rest-state CA, $\bar{\alpha}\approx 101°$, with low CA hysteresis, $\alpha_A-\alpha_R\approx 2°$ (Krumpfer & McCarthy 2010). We refer to this as the M00 system, according to water ('00'% glycerol) which is mobilized (M) by the silane coating. System M00 behaviour is exhibited in FIG. 2C. The relatively narrow hysteresis loop suggests little dissipation, at least according to the traditional diagram. We also study more viscous water-glycerol mixtures (20%, 40%, 50% and 60% glycerol) and less mobile coatings (F, fluorinated) to compare against this benchmark. For a detailed description of systems used in this study and their preparation, see Table 3 and Table 4 of Example 1, § 3.

Relevant dimensional scales are given in Table 1. To stay below the capillary length scale, small droplets are used. The volume-based length $D\equiv V^{1/3}$, where V is the drop volume, is approximately 2.7 mm for a drop volume of V=20 μL. This drop resonates at a measured frequency of approximately f=67 Hz, yielding a time scale $1/\omega$ of approximately 2.4 ms, Table 1. In comparison, the typical capillary time scale $\tau\equiv(\rho V/\sigma)^{1/2}$ is approximately 7 times longer. Alternative length scales include the typical plate excursion, A*, and the viscous layer thickness $\delta\equiv(v/\omega)^{1/2}$ which is approximately 0.05 mm. Note that this characteristic viscous layer is approximately half A* and approximately 1/50 the scale D. The comparison with D suggests that the viscous layer plays a limited role in the dynamics, at least for water. The observed CL velocity scale $U_{CL}$ is approximately 50% greater than the forcing velocity A*ω, attributed to the effectiveness of resonant excitation and to the low-hysteresis nature of the support coating. Finally, the typical acceleration is also approximately 50% greater than the acceleration of gravity. This suggests that significant deformation from the spherical cap shape may be expected.

TABLE 1

| Time (ms) | | Length (mm) | | | Velocity (mm s$^{-1}$) | | Acceleration (m s$^{-2}$) | Angle (deg.) |
|---|---|---|---|---|---|---|---|---|
| $1/\omega$ | $\tau^*$ | D | A* | $\delta$ | A*ω | $U_{CL}$ | $a\approx A^*\omega^2$ | $\Delta\alpha^*$ |
| 2.6 | 17 | 2.7 | 0.10 | 0.051 | 38 | 60 | 15 | 10 |

TABLE 1. Scales: forcing, $\omega^{-1}\equiv(2\pi f)^{-1}$; capillary, $\tau\equiv\sqrt{\rho V/\sigma}$; volume-based length, $D\equiv V^{1/3}$; typical forcing amplitude, A*; boundary layer thickness, $\delta\equiv\sqrt{v/\omega}$; forcing speed, A*ω, CL speed, $U_{CL}$; forcing acceleration A*ω²; maximum angle-deviation, $\Delta\alpha^*$; asterisk (*) denotes value fixed throughout the paper, a typical value used for scaling.

TABLE 2

| | Dimensional parameters | | | Dimensionless parameters (symbol and definition) | | | | | |
|---|---|---|---|---|---|---|---|---|---|
| | f | α | V | Oh | Re$_f$ | Bo$_f$ | Re$_o$ | Ca$_o$ | We$_o$ |
| System | (Hz) | (ms$^{-2}$) | (μl) | $\dfrac{\mu}{\sqrt{\rho D\sigma}}$ | $\dfrac{\alpha\rho D}{\mu\omega}$ | $\dfrac{\alpha\rho D^2}{\sigma}$ | $\dfrac{\rho U_{CL}D}{\mu}$ | $\dfrac{\mu U_{CL}}{\sigma}$ | $\dfrac{\rho U_{CL}^2 D}{\sigma}$ |
| M00 | 61 | 15 | 20 | 2.3 × 10$^{-3}$ | 100 | 1.5 | 160 | 8.4 × 10$^{-4}$ | 0.14 |
| F00 | 66 | 6.9 | 20 | 2.3 × 10$^{-3}$ | 45 | 0.71 | 110 | 5.6 × 10$^{-4}$ | 0.061 |

TABLE 2. Parameters, systems M00, F00: dimensional, drop of volume V driven at frequency f and acceleration a; dimensionless: definitions below symbols (subscripts: f='forcing', o='observed'), volume-length $D \equiv V^{1/3}$; note that $U_{CL}$ is a maximum; for system definitions, cf. Table 4.

TABLE 3

| Glycerol concentration (v/v %) | Density (kg m$^{-3}$) | Dynamic viscosity (mPa s) | Surface tension (mN m$^{-1}$) |
|---|---|---|---|
| 00 | 1000 | 1.00 | 71.7 |
| 20 | 1050 | 1.99 | 70.7 |
| 40 | 1100 | 4.83 | 69.1 |
| 50 | 1130 | 8.40 | 68.3 |
| 60 | 1160 | 16.1 | 67.3 |

TABLE 3. Water-glycerol mixture properties. Density and viscosity values based on empirical correlation (Cheng 2008). Surface tension values based on interpolation of experimental data (Glycerine Producers' Association 1963).

Dimensionless characterizations can be based on either the forced motion (subscript 'f') or the observed CL motion (subscript 'o'), Table 2. Observed scales (e.g. $U_{CL}$) often tend to better reflect the fluid dynamics but Table 1 for our experiments suggests little difference. Inertial-capillary spreading is characterized by Re>>1 and $Ca_o$<<1, as holds for M00. For both $We_o$ and $Ca_o$ characterizations, the local driving force for CL motion is the CA deviation, $\Delta\alpha$, which is more accurately characterized as $\sigma \sin(\Delta\alpha_{max})$ rather than simply $\sigma$. For $\Delta\alpha_{max} \sim 10°$, Table 1, the typical values listed in Table 2 are increased by nearly a factor of six. The $Ca_o$ remains small but the revised $We_o$ for M00 is much closer to one, consistent with the balance of inertia and capillarity in these motions.

1.1. Literature

There are many reviews of CL behaviour that include some combination of modelling, computation and measurement (Diez, Kondic & Bertozzi 2000; Pomeau 2001; Bonn et al. 2009; Savva & Kalliadasis 2011; Snoeijer & Andreotti 2013). Scarce mention of inertial-capillary CL motions is found in these. Snoeijer & Andreotti (2013) summarizes the situation where inertial-capillary behaviour is listed under future issues—'new challenges for moving contact lines emerge from the . . . inclusion of liquid inertia'.

TABLE 4

| Designation | Substrate | Surface treatment | Water $\alpha_A$ (deg.) | Water $\alpha_R$ (deg.) |
|---|---|---|---|---|
| Mxx (Mobile) | Silicon wafer | Trimethylsiloxy terminated PDMS | 102 | 100 |
| Fxx (Fluorinated) | Silicon wafer | Fluorinated trichlorosilane | 120 | 92 |

TABLE 4. System designation combines solid (M, F) and glycerol concentration (by volume) in water (xx %) where xx denotes 0, 20, 40, 50, 60%, Table 3, to yield M00, . . . , M60, and F00. CA measured using commercial goniometer, see Example 1, § 3.3.

Our literature review focuses on experimental work, justified by our example's focus on experiment. Inertial-capillary motion may be generated 'naturally' as in spreading by gravity (or capillarity) or be 'forced' as by a moving boundary. A traditional example of natural spreading occurs when gravity moves a drop down an inclined substrate (Mahadevan & Pomeau 1999; Aussillous & Quéré 2004; Hodges, Jensen & Rallison 2004). However, inertial motions may be the exception in such a set-up. Rapid natural transient motion driven by capillarity occurs in spreading on contact with a substrate (Bird, Mandre & Stone 2008; Carlson, Bellani & Amberg 2012; Winkels et al. 2012). Interest in these measurements has often been in the power law exponents characterizing the various spreading regimes. Sometimes, the relaxation of a contact line from an initial non-equilibrium configuration is aided by vibrational energy input (Andrieu, Sykes & Brochard 1994; Decker & Garoff 1996). Other kinds of forces used to drive transient inertial spreading include evaporation (e.g. Moffat, Sefiane & Shanahan 2009), impact (e.g. Yokoi et al. 2009), electromagnetic (e.g. Kocourek et al. 2006) and electrostatic (e.g. Sen & Kim 2009) forces.

Steady CL motions result from steady forcing motions. To achieve these, a set-up that plunges a tape into a liquid bath has been favoured by the coating flows community (Blake & Ruschak 1979). An advantage of this approach is that displacement (speed) rather than force (acceleration) is controlled and hence behaviour far from stick-slip can be readily achieved (Shen & Ruth 1998; Blake 2006; Kumar & Prabhu 2007). In their experiments, Perlin and co-authors (Ting & Perlin 1995; Jiang, Perlin & Schultz 2004; Perlin, Schultz & Liu 2004) drive a plunging plate in a cyclic manner. These studies report contact angle versus contact-line velocity diagrams that are more complicated than FIG. 1B, probably owing to the additional influence of gravity. Prior experimental studies that drive sessile drops cyclically using vertical vibration have devoted some attention to moving CLs (e.g. Noblin, Buguin & Brochard-Wyart 2004; Oh, Ko & Kang 2008; Noblin, Buguin & Brochard-Wyart 2009). For larger and flatter drops than ours, the focus has been on stick-slip CL behaviour, modelled as a dry friction oscillator (Noblin et al. 2004). A subsequent paper extends to driving amplitudes and frequencies where non-axisymmetric modes are excited (Noblin et al. 2009). The interesting idea of using vibration to induce CL motions in order to experimentally measure equilibrium contact angles has also been proposed in this paper.

Regarding the terminology 'mobility', some clarification is in order. Prior modelling and computational studies have introduced a function g(x), viewed as a single-valued representation of the CL behaviour, $\Delta\alpha = g(U_{CL})$ with $0 = g(0)$ (cf. FIG. 1B). The Tanner (1979) or Kistler-Hoffmann correlations (Schweizer & Kistler 2012) might be so-modelled. Linearization about the rest-state contact angle, $\Delta\alpha = 0$, yields, $$\Delta\alpha = \Lambda U_{CL} \text{ or } M\Delta\alpha = U_{CL} \text{ where } M \equiv \Lambda^{-1}, \quad (1.1a,b)$$

with $\Lambda = g'(0)$. Davis (1980) seems to have first introduced a $\Lambda$-like parameter, in his modelling of the moving CL of a meandering rivulet. Beginning with Hocking's use of this condition, it became known as the 'Hocking condition' even though Hocking attributed it to Davis (Hocking 1987). Borkar & Tsamopoulos (1991) refer to it as a 'phenomenological parameter', a 'property' of the materials involved, in their numerical study of liquid bridge oscillations. Lyubimov, Lyubimova & Shklyaev (2004, 2006) call $\Lambda$ the 'wetting parameter' while Fayzrakhmanova & Straube (2009) use both terms, 'Hocking condition' and 'wetting parameter', in computational studies of vibrated inviscid drops. All these studies treat $\Lambda$ as a way to model CL behaviour without complications of the observed multiplicity of contact angles for a given CL speed (hysteresis and associated nonlinearity).

We use the term 'mobility' in analogy with a particle subject to a force F that moves with a velocity U, MF=U. In Stokes flow M is called the 'Stokes mobility' and is just the inverse of the drag coefficient, $M=U/F=1/(6\pi\mu R)$. In the CL case, the uncompensated Young-Dupré force acts around the perimeter (radius R) in a direction tangent to the substrate, $$F=2\pi R\sigma[\cos\bar{\alpha}-\cos(\bar{\alpha}+\Delta\alpha)]. \quad (1.2)$$

If this is thought of as driving the CL motion, then $U_{CL}$ is given by, $F=\lambda U_{CL}$, where $\lambda$ is the resistance or CL drag coefficient. In the case of small disturbances $\Delta\alpha$ and near-neutral wetting, $\bar{\alpha}\approx\pi/2$, equation (1.2) reduces to $F\approx2\pi R\sigma\Delta\alpha$ and $M\equiv2\pi R\sigma/\lambda$. In summary, our mobility M formally satisfies (1.1) but our measurements that yield M are away from the stick-slip region so a different interpretation is appropriate. Mobility is the ease with which a liquid rapidly wets or unwets a solid support. It is the inverse of the CL drag coefficient. This perspective notwithstanding, in this paper we purposely avoid any reliance on theory in order to emphasize that our measurement procedure stands alone, independent of assumptions.

We begin by outlining the experimental procedure in Example 1, § 2 and detailing the materials and methods in Example 1, § 3. Section 4 of Example 1 follows with the basic experimental measurements presented in several different ways to highlight the distinctions between the regimes of motion. We propose in Example 1, § 5 the cyclic diagram which allows measurement of CL mobility, as detailed in Example 1, § 6. Section 7 of Example 1 discusses the robustness and generality of the proposed measurement procedure by looking at additional results. Finally, some concluding remarks are given in Example 1, § 8.

2. Experimental Overview

In this example, rapid contact-line motions are induced by forcing the drop near resonance. Prior studies (e.g. Whitehill, Neild & Stokes 2012) have driven drops in a similar fashion in order to observe spreading transients but do not study cyclic CL behaviour while other studies (e.g. Vukasinovic, Smith & Glezer 2007) have driven drops near resonance in order to achieve atomization but do not study CL behaviour.

Figure 3A:
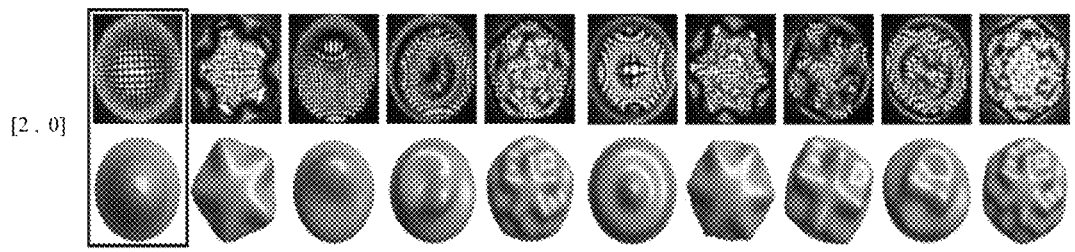
FIGS. 3A-3B illustrate shapes of various modes that resonate at different frequencies and an example of resonate frequency observation.
Figure 3B:
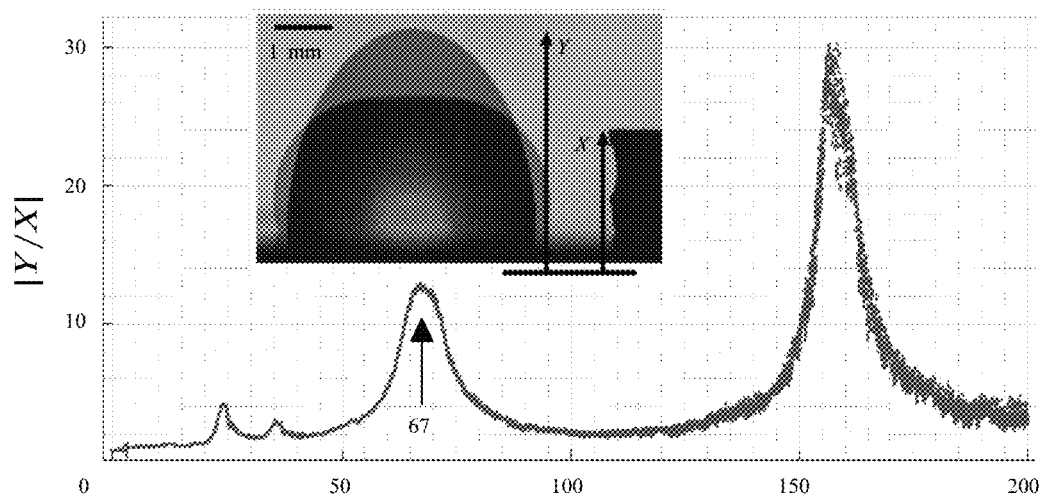

Shapes of various modes that resonate at different frequencies are shown in FIG. 3A. In this example, we excite the [2, 0] mode exclusively as it yields the most efficient coupling to CL motions. The resonant frequency for [2, 0] mode is observed experimentally from the maximum in drop apex deflection, Y, by a frequency sweep. FIG. 3B provides an example. At this volume, the resonant peak of mode [2, 0] occurs at ~67 Hz while the higher peak is at ~155 Hz and corresponds to mode [4,0]. The two small peaks at ~23 and ~35 Hz are subharmonic responses, placed outside the scope of this work. Our frequency sweep response is qualitatively similar to that obtained computationally by Korenchenko & Malkova (2015) with the notable difference that our [2, 0] peak is weaker than the [4, 0] peak. Based on the findings of Lyubimov et al. (2006) and our observations that the [2, 0] mode exhibits considerable CL motion while [4, 0] exhibits none, we believe this difference is the result of contact-line dissipation, precluded by the boundary conditions used in Korenchenko & Malkova (2015). To excite CL motions, f (or $\omega\equiv2\pi f$) is fixed near the [2, 0] resonance. Driving parameters are summarized in Table 2. For error analysis, see Example 2, § 1.

3. Materials and Methods

3.1. Materials

Trimethylsiloxy terminated poly(dimethylsiloxane) (PDMS) (Gelest, Product Code DMS-T22-100GM) was purchased from Gelest (Morrisville, Pa.). Silicon wafers (Silicon Quest International, catalogue no. 808-007) were purchased from Silicon Quest International (San Jose, Calif.). Sulphuric acid (95-98% min., MW 98.08, CAS #7664-93-9), toluene (99.5% min., MW 92.14, CAS #108-88-3) and acetone (CAS #67-64-1; Macron Chemicals) were purchased from VWM International (Radnor, Pa.). Hydrogen peroxide solution (50 wt. %, SKU 516813-500ML, CAS #7722-84-1, MW 34.01 g mol$^{-1}$) was purchased from Sigma-Aldrich (St. Louis, Mo.). High-purity compressed nitrogen was purchased from Airgas (Radnor, Pa.). Glass vials (20 ml borosilicate glass scintillation vial, catalogue no. 03-337-5) and light mineral oil (CAS #8042-47-5) were purchased from Fisher Scientific (Pittsburgh, Pa.).

Relevant properties of the liquids used in this work are given in Table 3. Designations and key characterizations of solid-liquid systems are given in Table 4.

3.2. Preparation of surfaces

To prepare substrate M, a silicon chip with dimensions of approximately 2×1 cm is cleft from a silicon wafer and sonicated (Ultrasonic Cleaner, model B2500A-DTH, VWR) in water for 20 min to remove solid particles on the surface. Any organic contaminants are then removed by soaking the chip in piranha solution (70% sulphuric acid/30% hydrogen peroxide) for 20 min. The chip is rinsed in running de-ionized (DI) water (purified by an Elga Ultra SC MK2, Siemens) for 10 min, blow dried using high-purity compressed nitrogen and cleaned using oxygen plasma (Basic Plasma Cleaner, model PDC-32G, Harrick Plasma) at 600 µm for 1 min. The chip is placed in a freshly opened glass vial and wet with as-received PDMS. The vial is capped and baked at 100° C. for 24 h. After the vial cools to room temperature, the substrate is rinsed in turn with toluene, acetone and DI water.

3.3. Characterization of Surfaces

Contact angle measurements are performed using an in-house MATLAB code and spot checked with a commercial goniometry software, DROPimage Advanced (Ramé-Hart Instrument Co., Succasunna, N.J.). An error analysis (Example 2, § 1) puts the uncertainty in the CA measurement code at ±1°.

3.4. Mechanical and Imaging Equipment

A system consisting of a function generator (Agilent 33220A, Agilent Technologies, Santa Clara, Calif.), a power amplifier (Crown CE2000, Crown Audio, Elkhart, Ind.) and a mechanical vibrator (PASCO SF-9324, PASCO, Roseville, Calif.) similar to that used by Chang et al. (2013) is responsible for generating the mechanical vibrations. The solid sample surfaces are mounted horizontally on the vibrator. A manual microsyringe (Gilmont GS 1200, Cole-Parmer, Vernon Hills, Ill.) is used to dispense the test liquids. Typically, drops of 20 µl are used.

A RedLake HG-XL imaging system (DEL Imaging Systems, Cheshire, Conn.) fitted with a Tamron SP AF 90 mm f/2.8 Di Macro Lens (Tamron USA, Inc., Commack, N.Y.)

is used to capture high-speed, side view images of the experiment. Typical frame rates used are in the range of 2000-5000 Hz. The typical spatial resolution is 10 μm pixel$^{-1}$.

3.5. Image Analysis

The useful measurements of the experiment are derived from the side view profile of the drop, supplemented by the measurement of support displacement. For instance, the contact-line velocity is approximated by the numerical time derivative of the drop profile where it joins the substrate. Meanwhile, the contact angle is measured using the tangent line of the drop profile at the contact line, as approximated using a secant method.

3.6. Data Reduction

Where quantities are said to be scaled, the scaling factors are as follows (cf. Table 1). Length scale: $A^*=0.1$ mm; time scale: $\sigma^*=17$ ms; angular scale: $\Delta\alpha^*=10°$.

Where plots are given in red, blue and green colours, the colour coding denotes the following. Blue: $|U_{CL}|/\max(U_{CL})>0.6$, green: $0.1<|U_{CL}|/\max(U_{CL})<0.6$, red: $|U_{CL}|/\max(U_{CL})<0.1$. The lower threshold value of 0.1 is arbitrarily chosen while the determination of the upper threshold of 0.6 will be discussed in Example 1, § 5. The degree of ambiguity and arbitrariness in the evaluation of our final result of interest, the mobility parameter, is detailed in Example 2, § 1.3, with the relative uncertainty typically within ±3%.

4. Contact-Line Response: Stick, Shoulder and Wing Regions

The motion of the contact line in response to cyclic excitation is shown in six snapshot schematics in FIG. 4A. The vertical dashed line, fixed in the platform frame, is a reference for the CL rest position and the CA rest tangent. The CA rest tangent is vertical since the rest CA is taken to be $\not\equiv=90°$, for simplicity. The displacement $\eta$, contact angle $\alpha$ and their directions-of-change (straight arrow, $\dot\eta$; curved arrow, $\dot\alpha$) are shown for one cycle of the platform motion. Extremes of displacement occur at the 3 and 9 o'clock positions. These correspond to sticking where the CL pins while the CA changes. Extremes of $\Delta\alpha$ occur near the 11 and 5 o'clock positions, at instants when the angle changes direction. Selected schematics are added judiciously to subsequent plots to guide the reader. FIG. 4B reproduces a subset of the data in FIG. 2C. The stick region has been coloured red, the shoulders green and the wings blue. In this way, the colour of each data point in FIG. 4B defines its identity. Different mappings of the data of FIG. 4B, retaining their colours, are reported in FIGS. 4C-4E. That is, FIGS. 4C-4E consist of three re-plots of the data of the traditional diagram (TD), FIG. 4B. FIGS. 4C-4D are platform and CL displacement phase-plane plots, while FIG. 4E is mixed CA-CL displacement diagram.

FIG. 4C plots the platform phase plane, $\dot X$ versus X. (Note that the axes have different scales to make the plot circular. This different scaling of axes counters our scaling of time in $\dot X$ (y-axis) by the capillary time $\tau^*$ rather than by the resonance time $(2\pi f)^{-1}$. That is, if the resonance time were properly used instead, the plot would naturally be circular.) The circular shape shows that simple harmonic motion has been mechanically achieved by the shaker table, to a good approximation. The stick regions correspond to extremes of displacement ($\dot X=0$) and the wing regions to extremes of speed ($X=0$). This mapping serves as the clock for the cyclic CL motion. Sticking (red) is estimated to occupy 26%, the shoulders (green) 38% and the wings (blue) 36% of a driving period. Moreover, these regions are nearly in phase with the driving motion, suggesting that damping plays little role in the response.

FIG. 4D shows the phase plane of $\eta$ versus $\dot\eta$ with the clock as reference (same scales). The black circle is deformed to the coloured loop. The deviation from a circle in the CL phase plane is a measure of the deviation of the CL motion from harmonic oscillation. The asymmetry about the horizontal axis speaks to the difference between advancing/receding CL. The asymmetry about the vertical axis speaks to the phase lead/lag of the advancing/receding CL. Overall, the mapping of the circle to the deformed loop reveals a characterization of the CL response. Notable features are that (i) while both advancing and receding, the greatest $\dot\eta$ occurs nearby but does not coincide with $\eta=0$; and that (ii) the distortion of the advancing wing is greater (and sharper) than that of the receding wing.

FIG. 4E plots the remaining combination of the three observables $\Delta\alpha$ versus $\eta$. This highlights the cyclic $\Delta\alpha$ behaviour. Most strikingly, the loop has become nearly rectangular with slightly rounded shoulders. Thus, we see that CA behaviour is dominated by stick (red) and wing (blue) regions. However, a perfectly rectangular response would correspond to a constant $\Delta\alpha$ along each wing segment. A closer look suggests that $\Delta\alpha$ decreases monotonically as the CL rapidly passes the reference position, both going and coming, which suggests that the loop is actually a sheared rectangle. In either case, the simplicity of how the stick and rapidly moving CL regions fit together is striking. The area within the loop is related to the CL dissipation per cycle (Xia, Daniel & Steen 2017). Finally, one also notes that advancing, $\alpha_A$ and $\alpha_{A'}$, and receding CAs, $\alpha_R$ and $\alpha_{R'}$, can easily be read off the diagram, as boundaries between red-green and green-red colour changes.

5. Unmasking the Linearity of Wing Regions: the Cyclic Diagram

In FIG. 4E, the two wing regions are observed to be two sides of an approximate quadrilateral. To study the wing behaviour more closely, we remap the data yet again. Within each of the two wing regions, FIG. 4B, the reference position is traversed once. To map the wings into a neighbourhood of the origin, both axes of FIG. 4B are scaled by $1/\eta$. The result is the diagram, $\eta\Delta\alpha$ versus $\eta\dot\eta$, FIG. 5A. We call this the CL cyclic diagram, or simply cyclic diagram, a diagram that combines the three essential measurements, $\eta$, $\dot\eta$ and $\Delta\alpha$. It is noted here that, in general, FIG. 5A requires a prerequisite 'balancing' step, which will be discussed below in Example 1, § 6.

In the schematic version of the cyclic diagram, FIG. 5B, the neighbourhood of the origin is crossed four times during a cycle while each of two loops (solid and dotted) is traversed just once. The presence of two loops per cycle is due to the advancing and receding phases of the driving period each tracing out a loop. In this case, the loops are of similar shape. The origin plays a double role, representing simultaneously (i) the reference—($\eta=0$) and (ii) the stick—($\dot\eta=0$) with mean angle ($\Delta\alpha=0$) positions. The super-harmonic feature of the cyclic diagram derives from the quadratic nature of the coordinates—if $\eta$ and $\dot\eta$ were approximated by a sine and cosine waves of the same frequency, respectively, then $\eta\dot\eta$ would be a sine wave of twice that frequency.

Remarkably, in the cyclic diagram the wing regions map to a single region passing through the origin, well approximated as linear. Note that the formation of this linear region is independent of any colouring scheme; it serves as the basis for identifying the wing region in the traditional diagram. The slope of this line represents a property of the traditional diagram since the same weighting factor, η, is applied to both axes and thereby preserves the original information in the TD. This property, measured as the slope Λ, is what we call the CL drag resistance or drag coefficient (inverse mobility), cf. FIG. 5B. To appreciate its interpretation as a drag to CL motion, first consider the limit of Λ→∞ where FIG. 5B approaches a vertical line segment centred on the origin. This picture would imply that despite any change in CA, presumably brought about by applied forcing, there is no CL motion. The CL is pinned. In the opposite limit of Λ→0, FIG. 5B approaches a horizontal line, so arbitrary CL motion can take place without any applied forcing. The CL is fully mobile.

The interpretation of the two cyclic diagram loops is immediate. Start at the top of the red region in FIG. 5A, say. For a CL that has just stopped receding, η at this particular instant is at its negative extremum (η<0). The CA then increases while the CL remains 'in sticking mode' (hysteresis), traversing vertically downwards through the red region. This corresponds to the sketch in the 9 o'clock position in FIG. 4A. Eventually, the CL begins to advance as red turns to green, cf. 10 o'clock sketch in FIG. 4A. The CL then accelerates and enters the linear region (blue) beginning at the bottom left corner. As the CL continues advancing through the reference position into positive territory (η>0), cf. 12 o'clock sketch in FIG. 4A, the advancement slows and blue turns to the green at the top right. Once advancement halts, η is at its positive extremum (η>0), cf. 3 o'clock sketch in FIG. 4A, and the system returns to near our starting point. It is not actually our starting point however, since η>0. The motions described so far only constitute the sticking-advancing phase cf. 9 through 3 o'clock sketches in FIG. 4A. A sticking-receding phase follows, cf. 3 through 9 o'clock sketches in FIG. 4A. Therefore, the full cycle of stick-advance-stick-recede would trace out yet another overlapping loop in the cyclic diagram. The two loops are illustrated schematically in FIG. 5B, one solid and one dotted. FIG. 5C will be discussed in the next section.

6. Mobility Measurement and CA Balancing

Mobility characterizes how CL speed $\dot{\eta}$ relates to CA deviation, $\Delta\alpha \equiv \alpha - \bar{\alpha}$, where $\bar{\alpha}$ is a reference CA. $\bar{\alpha}$ can be an evaluation of the equilibrium contact angle, $\bar{\alpha} = \alpha_e$, say, or the average of advancing and receding angles, $\alpha = (\alpha_A \alpha_R)/2$ (cf. FIG. 1B), taken from separate static measurements, or it can be left as a free parameter. We choose the latter to avoid attaching physical interpretation to the value without justification. For the low-hysteresis system M00, subsequent fitting yields $\bar{\alpha} \approx \alpha_A \approx \alpha_R \approx \alpha_e$, so reference CA distinctions are lost in this case.

The slope of $\eta\Delta\alpha$ versus $\eta U_{CL}$ characterizes the resistance to CL motion, $$\eta\Delta\alpha = \Lambda\eta U_{CL}. \tag{6.1}$$

In view of the mobility, $M \equiv 1/\lambda$, limits $M \to 0$ ($\Lambda \to \infty$) describe a pinned CL and $M \to \infty$ ($\lambda \to 0$), a fully mobile CL, as mentioned in Example 1, § 5. We shall report Λ values below. In the absence of a molecular basis for scaling Λ, we will scale empirically using length D, time τ* and angle deviation Δα*, as provided in Table 1.

Mobility 1/Λ is measured by doing a best fit of (6.1) to the wing data, using as a free parameter. The best fit to the data of FIG. 5A yields $\bar{\alpha} = 101°$, identical to the static CA measured by conventional goniometer (Table 4), within experimental error. For M00, one finds $\Lambda = 0.14\Delta\alpha^*\tau^*/A^*$. This is the slope of the blue data through the origin of the cyclic diagram, FIG. 5A. The value of $\lambda = 0.14\alpha^*\tau^*/A^*$ means that a 10° change in CA corresponds to a 4.64 cm s$^{-1}$ change in CL speed. Over one driving cycle period of 16 ms, the total CA excursion amounts to about ±10° and the net excursion of the CL is approximately 0.2 mm.

One might expect that advancing and receding CLs wings, in general, could have different mobilities. This could well be the case if $\bar{a}$ is set to be an independently determined (or assumed) value. In place of FIG. 5B, one would then find two loops of data, as shown in schematic in FIG. 5C. The advancing (A) and receding (R) loops have different slopes passing through the origin. The angle φ between the linear segments is a measure of the deviation or asymmetry of advancing/receding behaviours. In the general case, with foreknowledge of the asymmetry α, one could seek a 2-parameter fit for each of two resistances, $A_A$ and $A_R$, but the foreknowledge requires information not readily available from existing measurement techniques.

In this example, we eschew the need for any additional information or assumptions by contenting ourselves with an overall mobility characterization for both the advancing and receding regimes. The M00 system lends itself to this approach with its low hysteresis that makes it naturally symmetric (φ~0). Our 1-parameter fit procedure is equivalent to minimizing angle φ in FIG. 5C over $\bar{\alpha}$. That is, we find the value of α that minimizes the R-squared value of a single-parameter fit (linear regression) over the linear region in FIG. 5C. We refer to this procedure as 'balancing the CA', essentially a symmetrization procedure.

7. Results and Discussion

Various response diagrams have been introduced in order to study the moving contact line during inertial-capillary wetting/unwetting motions. Each highlights different features.

The platform phase plane serves as a clock. It yields the fractions of the driving period that the motion spends in stick and wing regions. The mixing of colours indicates the relative regularity of the various regime transitions. There is some mixing at each transition yet the stick-slip and slip-stick transitions exhibit the most mixing, FIG. 4C. The clock also confirms the extent to which the driving platform delivers a simple harmonic motion. By FIG. 4C, our driving is harmonic to good approximation.

The CL phase plane reflects how the droplet filters the driving motion to the CL motion. Both amplitude and phase of the mapping from platform to CL motion carry information. Remarkably, amplitudes η are of the same order as amplitudes X while $U_{CL}$ is 2-fold greater than $\dot{X}$, a benefit of resonance. The advancing wing (wetting) is more regular with greater amplitudes than the receding wing (unwetting), as noted by prior studies (e.g. Elliott & Riddiford 1967). Regarding phase difference, maximum speeds on advancing and receding wings both occur before platform maximums. New here is a means to measure the differences in regularity, with the benefit of multicyclic statistics. In summary, the mapping from the platform to the CL phase plane is a new and useful characterization of CL motions.

The mixed diagram, FIG. 4E, yields yet another view of drop response. Here, the stick regions are naturally vertical yet, surprisingly, the wing regions are nearly horizontal and occupy most of the rest of the loop. That is, this mapping reveals the extent to which the stick and wing regions dominate the CA behaviour. The response might be productively modelled as a quadrilateral.

The CL cyclic diagram is distinguished by its quadratic nature. The axes in this diagram are scaled to bring the sweeping of the CL past the rest position into focus. The wing regions map to a linear segment whose inverse slope yields the mobility measurement. Definition of the wing regions, alternatively, could be specified in the cyclic diagram. The surprise then is that (i) the wing regions are linear to a good approximation and (ii) the linearity corresponds to a major fraction of the driving cycle.

How is mobility influenced by the support affinity? An F00 system exhibits greater hysteresis, $\alpha_A - \alpha_R$, and a higher static CA, Table 4 and $\Lambda$ doubles from the M00 value, Table 5. This greater resistance to mobility is consistent with the higher hysteresis due to surface chemistry. For the various F00 diagrams, see Example 2, § 2 and FIGS. 7A-7E. These show an overall similarity to the M00 diagrams. Increasing bulk viscosity also decreases mobility, cf. M40 and M60, Table 5. Note that identical volumes, V, and similar accelerations, a, are used.

The breadth of usefulness of the cyclic diagram (and dynamic balancing procedure) depends on the extent to which mobility is a material-like parameter, like viscosity given by a rheometer and used to make predictions in other flow geometries and contexts. This important consideration is beyond the scope of this example. However, a necessary condition is that measured mobility parameters for driving drops near resonance be independent of details of our cyclic-dynamic protocol. Next, we argue this point.

TABLE 5

| System | a (m s$^{-2}$) | V (µl) | $\Lambda/(\Delta\alpha^*\tau^*/A^*)$ | $M/(A^*/\Delta\alpha^*\tau^*)$ |
|---|---|---|---|---|
| M00 | 14.3 | 20 | 0.14 | 7.1 |
| F00 | 13.3 | 20 | 0.28 | 3.6 |
| M40 | 12.8 | 20 | 0.34 | 2.9 |
| M60 | 13.0 | 20 | 0.45 | 2.2 |

TABLE 5. Measured $\lambda$ and M for Mxx and F00 systems. $\alpha\alpha^*\tau^*/A^* = 17$ s cm$^{-1}$.

To what extent is mobility independent of V and a? Capillary resonance depends on drop volume and large volumes invoke gravity. Additionally, higher accelerations distort shapes and influence CL behaviour. Minimal influence of gravity on capillarity is ensured by $Bo \equiv \rho g D^2/\sigma \ll 1$, and on driving acceleration by $g/a \ll 1$, both limited by extreme shape distortions that come with higher accelerations that ultimately result in atomization.

For the M00 system, measured values of $\Lambda$ at varying driving acceleration and drop sizes are given in FIGS. 6A-6B. For low enough driving acceleration or volume, the CL remains pinned, as expected given the stick-slip behaviour reported in prior literature (Noblin et al. 2004), and $\Lambda$ is not relevant ($\Lambda \rightarrow \infty$). In FIG. 6A, for moderate accelerations or volumes, $\rho a D^2/\sigma \approx 1$, and as driving acceleration or drop volume increases, $\Lambda$ approaches a plateau. In FIG. 6B, we examine the viscous boundary layer thickness, $\delta = \sqrt{\nu/\omega}$, similar to the Stokes boundary layer thickness (Batchelor 1999), and scale by the drop size. The ratio $d \equiv \delta/D$ then gives a measure of the oscillatory boundary layer thickness relative to drop size. FIG. 6B shows that, for small enough size, the relatively large thickness begins to influence scaled $\Lambda$. The influences of small thickness, acceleration and volume are similar. The asymptotic behaviour of FIGS. 6A-6B is typical of the systems studied, suggesting a range where $\Lambda$ is independent of experimental protocol.

8. Concluding Remarks

We experimentally study the motion of contact lines (CL) by driving a sessile water drop near resonance. The motions conform to classical CL behaviour, by the traditional diagram (TD). We then use the TD to identify stick and wing regions. The stick region starts (ends) at the onset of sticking (slipping) on a receding (advancing) CL. By colouring the data by region, one can observe how the TD maps to the CL cyclic diagram. For water on a neutrally wetting and low-hysteresis support, the cyclic diagram reveals a linear response of wing data which yields the CL mobility measurement.

Any system of partially wetting liquid and support can be tested by the procedure introduced here. Wing regions can be anticipated—they appear routinely in the nearly 50 years of reporting data in the TD format. Hence, our approach is of broadest applicability. What cannot be anticipated is a successful mobility measurement from the cyclic diagram.

Demonstrating how to measure mobility suggests a way around the long-standing difficulty, by way of reinterpretation, that systems that display CA hysteresis do not have a well-defined linearized stability theory (Davis 1983). Mobility measurement has been demonstrated for water on support M. This is a 'sweet spot' in parameter space. Mobility decreases from this sweet spot for system F00, owing to increasing CA hysteresis. Mobility also decreases from the F00 value with increasing bulk viscosity, FIG. 8.

A number of open questions remain. How far from the sweet spot in parameter space will the dynamic CA procedure still successfully yield a mobility measurement? To what extent is mobility a material-like parameter (as mentioned)? Finally, to what extent can theory account for the sweet spot and predict the mobility values?

In summary, the introduced diagrams reveal a wealth of information about rapidly moving CLs and subsume the TD. All the features from the TD, including $\alpha$, $\alpha_A$, $\alpha_{A'}$, $\alpha_R$, $\alpha_{R'}$ near the stick-slip boundary, can be extracted. In much the same way, the dynamic CA goniometer subsumes the traditional goniometer, using measurements that are cyclically averaged. The information revealed is highlighted by the cyclic diagram remapping which, in conjunction with the cyclic measurements, enables the mobility to be measured. To the inventors' knowledge, this procedure has yielded the first direct, experimental measurement of mobility for rapid CL motions.

Example 2

Moving Contact Line Mobility Measured: Supplemental Material

Example 2 provides supplemental material relating to the experimental information described in Example 1.

1. Error Analysis

1.1. Velocity and Position

Since velocity is estimated as the numerical time derivative of position measurements based on a central differencing scheme, the absolute error in velocity can be shown to be approximately $$\delta V = \delta x/(\sqrt{2}\Delta t), \quad (1.1)$$

where $\delta V$ and $\delta x$ are the uncertainties in velocity and position, respectively, while $\Delta t$ is the time step between consecutive frames.

Having incorporated a sub-pixel edge detection algorithm (Trujillo-Pino et al. 2013), $\delta x$ is expected to be smaller than a pixel but its approximate size is not immediately available. On the other hand, an approximation for $\delta V$ can in fact be obtained by examining the CA-$U_{CL}$ plot in FIG. 2C. Here in the essentially vertical band, the true value of the velocity is expected to be zero as the CL is in the "stick" part of stick-slip motion. The spread in values of $U_{CL}$ then gives an estimate for $\delta V$ at about 5 mm/s. It follows from equation 1.1 (Example 2) that $\delta x$ is between 1 to 2 μm. This is indeed an improvement over the pixel-level resolution of about 10 μm per pixel, justifying the additional computational complexity for implementing sub-pixel edge detection.

1.2. Contact Angle

An industrial practice for the calibration of CA measurements is to use a solid sphere partially visible above a horizontal substrate. The contact angle between the image of the sphere and the substrate can then be measured optically and verified against calculations based on known geometry (First Ten Angstroms 2004). In order to isolate the uncertainty of our CA measurement algorithm, a synthetic image of a circle was used instead. The CA values as measured by image analysis are compared against analytically determined values and the errors are between −1.5° to 0.5° over the range of CA values relevant to this work.

1.3. Mobility

As $\Lambda$ is a derived quantity based on statistical analysis, the random error in $\Lambda$ can be reduced simply by collecting data over longer times. Therefore, the most significant contribution to the uncertainty in $\Lambda$ comes from the two free parameters used in its evaluation. The first parameter is the assumed value of the equilibrium contact angle, $\alpha$, which affects the alignment between the advancing and receding parts of the linear region in the double-loop diagram. The second parameter is the threshold velocity value, $U_{thresh}$, that determines the boundaries of the linear region.

For $\alpha$, an unambiguous maximum can be found in the R-squared value of the linear fit to the linear region, at a particular value of $U_{thresh}$. This value of $\alpha$ that maximizes the R-squared value is used in our evaluation of $\Lambda$. Varying $U_{thresh}$ over a range of reasonable values produces a values within about 0.4°, with negligible impact on the final evaluation of $\Lambda$.

For $U_{thresh}$, there is indeed some ambiguity about where exactly the linear region ends and the transition regions begin. However, choosing a value that clearly includes some of the transitional data points or clearly excludes some data in the extremities of the linear region results in a spread of $\Lambda$ values within ±3%.

2. Graphical Results for System F00

Water has i) a high surface tension with low viscosity and water on M exhibits ii) a rest state CA near 90° with iii) a low CA hysteresis. Choice i) favours underdamped vibrations and the inertial-capillary balance. Choice iii) favours a shorter sticking duration (26%, c.f. FIG. 4B) to benefit a longer wing duration (36%, c.f. FIG. 4B) where CL sweeping occurs. Choice ii) with iii) favours the symmetry of a traditional diagram that, on mapping to the CLCD, naturally collapses both wing regions, thus favouring a single mobility measurement.

The F00 system exhibits greater CA hysteresis and a more phobic rest state CA, Table 4. Shown in FIGS. 7A-7E are plots corresponding to FIGS. 4B, 4C, 4D, 4E, and 5A for the M00 system in Example 1. Note that the smaller A used results in more significant noise than the diagrams for M00. In addition, this particular experiment required a leveling of the images, resulting in further errors most clearly seen in the saw-tooth waveform superimposed on the circle in FIG. 7C. The relative ease with which the linear region can be identified in the CLCD is further testament to the robustness of the procedure.

Owing to greater hysteresis of the F00 system, more time per driving period is spent in the stick region. For a similar reason, there is more mixing of colours. The F00 diagram (see FIG. 4B; Example 1, § 8) exhibits a distortion similar to M00 but a greater advancing vs receding asymmetry. Importantly, the collapsed wing region in the F00 CLCD is linear, from which $\Lambda$ can be readily measured.

3. Viscosity

Figure 8:
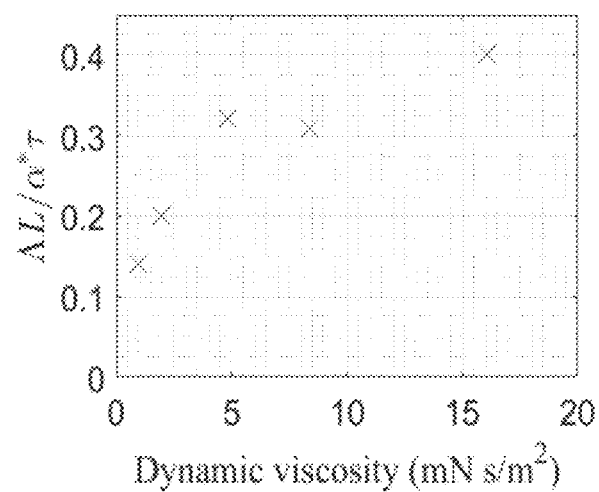
FIG. 8 is a graph illustrating a plot of $\Lambda$ vs. μ for a 20 μL drop, systems M00 through M60.

FIG. 8 illustrates the trend in A when viscosity is varied using different concentrations of glycerol in the test liquid. While other liquid properties do change by up to 15% with the addition of glycerol, we consider the dominant variable to be the dynamic viscosity which increases more than ten-fold over the range of glycerol concentration. The results, taken together with the baseline value, suggest that increases with viscosity. This trend has previously been shown in a molecular-kinetic theory treatment (Blake & De Coninck 2002) as well as in experimental results (Burley & Kennedy 1976; Blake 1993; Bostwick & Steen 2016).

REFERENCES

Citation of a reference herein shall not be construed as an admission that such reference is prior art to the present invention. All references cited herein are hereby incorporated by reference in their entirety. Below is a listing of various references relating to the present disclosure:

ANDRIEU, C., SYKES, C. & BROCHARD, F. 1994 Average spreading parameter on heterogeneous surfaces. *Langmuir* 10 (7), 2077-2080.

AUSSILLOUS, P. & QUÉRÉ, D. 2004 Shapes of rolling liquid drops. *J. Fluid Mech.* 512, 133-151.

BATCHELOR, G. K. 1999 *An Introduction to Fluid Dynamics*. Cambridge University Press.

BIRD, J. C., MANDRE, S. & STONE, H. A. 2008 Short-time dynamics of partial wetting. *Phys. Rev. Lett.* 100 (23), 234501.

BLAKE, T. D. 1993 *Wettability*. New York: Marcel Dekker.

BLAKE, T. D. 2006 The physics of moving wetting lines. *J. Colloid Interface Sci.* 299 (1), 1-13.

BLAKE, T. D. & DE CONINCK, J. 2002 The influence of solid-liquid interactions on dynamic wetting. *Advances in Colloid and Interface Science* 96 (1-3), 21-36.

BLAKE, T. D. & RUSCHAK, K. J. 1979 A maximum speed of wetting. *Nature* 282 (5738), 489-491. BONN, D., EGGERS, J., INDEKEU, J. & MEUNIER, J. 2009 Wetting and spreading. *Rev. Mod. Phys.* 81 (2), 739-805.

BORKAR, A. & TSAMOPOULOS, J. 1991 Boundary-layer analysis of the dynamics of axisymmetric capillary bridges. *Phys. Fluids* A 3 (12), 2866-2874.

BOSTWICK, J. B. & STEEN, P. H. 2014 Dynamics of sessile drops. Part 1. Inviscid theory. *J. Fluid Mech.* 760, 5-38.

BOSTWICK, J. B. & STEEN, P. H. 2016 Response of driven sessile drops with contact-line dissipation. *Soft Matter* 12 (12), 8919-8926.

BURLEY, R. & KENNEDY, B. S. 1976 An experimental study of air entrainment at a solid/liquid/gas interface. *Chemical Engineering Science* 31 (10), 901-911.

CARLSON, A., BELLANI, G. & AMBERG, G. 2012 Contact line dissipation in short-time dynamic wetting. *Europhys. Lett.* 97 (4), 44004.

CHANG, C.-T., BOSTWICK, J. B., DANIEL, S. & STEEN, P. H. 2015 Dynamics of sessile drops. Part 2. Experiment. *J. Fluid Mech.* 768, 442-467.

CHANG, C.-T., BOSTWICK, J. B., STEEN, P. H. & DANIEL, S. 2013 Substrate constraint modifies the Rayleigh spectrum of vibrating sessile drops. *Phys. Rev. E* 88,23015.

CHENG, N.-S. 2008 Formula for the viscosity of a glycerol-water mixture. *Ind. Engng Chem. Res.* 47 (9), 3285-3288.

DAVIS, S. H. 1980 Moving contact lines and rivulet instabilities. Part 1. The static rivulet. *J. Fluid Mech.* 98, 225-242.

DAVIS, S. H. 1983 Contact-line problems in fluid mechanics. *J. Appl. Mech.* 50, 977-982.

DECKER, E. L. & GAROFF, S. 1996 Using vibrational noise to probe energy barriers producing contact angle hysteresis. *Langmuir* 12 (8), 2100-2110.

DIEZ, J. A., KONDIC, L. & BERTOZZI, A. L. 2000 Global models for moving contact lines. *Phys. Rev. E* 63 (1), 011208.

DUSSAN, V. E. B. 1979 On the spreading of liquids on solid surfaces: static and dynamic contact lines. *Annu. Rev. Fluid Mech.* 11 (1968), 371-400.

ELLIOTT, G. E. P. & RIDDIFORD, A. C. 1967 Dynamic contact angles I. The effect of impressed motion. *J. Colloid Interface Sci.* 23, 389-398.

FAYZRAKHMANOVA, I. S. & STRAUBE, A. V. 2009 Stick-slip dynamics of an oscillated sessile drop. *Phys. Fluids* 21 (7), 072104.

FIRST TEN ANGSTROMS 2004 Contact Angle Standard Calibration: One Standard Per Block Models. *Tech. Rep.*

GLYCERINE PRODUCERS' ASSOCIATION 1963 *Physical Properties of Glycerine and its Solutions*. New York.

GNANAPPA, A. K., GOGOLIDES, E., EVANGELISTA, F. & RIEPEN, M. 2011 Contact line dynamics of a superhydrophobic surface: application for immersion lithography. *Microfluid. Nanofluid.* 10 (6), 1351-1357.

HOCKING, L. M. 1987 The damping of capillary-gravity waves at a rigid boundary. *J. Fluid Mech.* 179, 253-266.

HODGES, S. R., JENSEN, O. E. & RALLISON, J. M. 2004 Sliding, slipping and rolling: the sedimentation of a viscous drop down a gently inclined plane. *J. Fluid Mech.* 512, 95-131.

JIANG, L., PERLIN, M. & SCHULTZ, W. W. 2004 Contact-line dynamics and damping for oscillating free surface flows. *Phys. Fluids* 16 (3), 748-758.

KOCOUREK, V., KARCHER, C H., CONRATH, M. & SCHULZE, D. 2006 Stability of liquid metal drops affected by a high-frequency magnetic field. *Phys. Rev. E* 74 (2), 026303.

KORENCHENKO, A. E. & MALKOVA, J. P. 2015 Numerical investigation of phase relationships in an oscillating sessile drop. *Phys. Fluids* 27 (10), 102104.

KRUMPFER, J. W. & MCCARTHY, T. J. 2010 Contact angle hysteresis: a different view and a trivial recipe for low hysteresis hydrophobic surfaces. *Faraday Discuss.* 146, 103-111.

KRUPENKIN, T. & TAYLOR, J. A. 2011 Reverse electrowetting as a new approach to high-power energy harvesting. *Nat. Commun.* 2,448.

KUMAR, G. & PRABHU, K. N. 2007 Review of non-reactive and reactive wetting of liquids on surfaces. *Adv. Colloid Interface Sci.* 133 (2), 61-89.

LYUBIMOV, D. V., LYUBIMOVA, T. P. & SHKLYAEV, S. V. 2004 Non-axisymmetric oscillations of a hemispherical drop. *Fluid Dyn.* 39 (6), 851-862.

LYUBIMOV, D. V., LYUBIMOVA, T. P. & SHKLYAEV, S. V. 2006 Behavior of a drop on an oscillating solid plate. *Phys. Fluids* 18 (1), 012101.

MAHADEVAN, L. & POMEAU, Y. 1999 Rolling droplets. *Phys. Fluids* 11 (9), 2449-2453.

MOFFAT, J. R., SEFIANE, K. & SHANAHAN, M. E. R. 2009 Effect of $TiO_2$ nanoparticles on contact line stick-slip behavior of volatile drops. *J. Phys. Chem.* B 113 (26), 8860-8866.

NOBLIN, X., BUGUIN, A. & BROCHARD-WYART, F. 2004 Vibrated sessile drops: transition between pinned and mobile contact line oscillations. *Eur. Phys. J. E* 14 (4), 395-404.

NOBLIN, X., BUGUIN, A. & BROCHARD-WYART, F. 2009 Vibrations of sessile drops. *Eur. Phys. J.* 166 (1), 7-10.

OH, J. M., KO, S. H. & KANG, K. H. 2008 Shape oscillation of a drop in AC electrowetting. *Langmuir* 24 (15), 8379-8386.

PERLIN, M., SCHULTZ, W. W. & LIU, Z. 2004 High Reynolds number oscillating contact lines. *Wave Motion* 40 (1), 41-56.

POMEAU, Y. 2001 Moving contact line. *Le Journal de Physique IV* 11 (PR6), Pr6-199-Pr6-212.

SAVVA, N. & KALLIADASIS, S. 2011 Dynamics of moving contact lines: a comparison between slip and precursor film models. *Europhys. Lett.* 94 (6), 64004.

SCHWEIZER, P. M. & KISTLER, S. F. 2012 *Liquid Film Coating: Scientific Principles and their Technological Implications*. Springer Science & Business Media.

SEN, P. & KIM, C. J. 2009 A fast liquid-metal droplet microswitch using EWOD-driven contact-line sliding. *J. Microelectromech. Syst.* 18 (1), 174-185.

SHEN, C. & RUTH, D. W. 1998 Experimental and numerical investigations of the interface profile close to a moving contact line. *Phys. Fluids* 10 (4), 789-799.

SNOEIJER, J. H. & ANDREOTTI, B. 2013 Moving contact lines: scales, regimes, and dynamical transitions. *Annu. Rev. Fluid Mech.* 45 (1), 269-292.

SRINIVASAN, R. 2003 Estimating zero-g flow rates in open channels having capillary pumping vanes. *Intl J. Numer. Meth. Fluids* 41 (4), 389-417.

TANNER, L. H. 1979 The spreading of silicone oil drops on horizontal surfaces. *J. Phys. D* 12 (9), 1473.

TING, C.-L. & PERLIN, M. 1995 Boundary conditions in the vicinity of the contact line at a vertically oscillating upright plate: an experimental investigation. *J. Fluid Mech.* 295, 263-300.

TRUJILLO-PINO, A., KRISSIAN, K., ALEMAN-FLORES, M. & SANTANA-CEDRÉS, D. 2013 Accurate subpixel edge location based on partial area effect. *Image and Vision Computing* 31 (1), 72-90.

VUKASINOVIC, B., SMITH, M. K. & GLEZER, A. 2007 Dynamics of a sessile drop in forced vibration. *J. Fluid Mech.* 587, 395-423.

WHITEHILL, J. D., NEILD, A. & STOKES, M. H. 2012 Forced spreading behavior of droplets undergoing low frequency vibration. *Colloids Surf.* A 393, 144-152.

WINKELS, K. G., WEIJS, J. H., EDDI, A. & SNOEIJER, J. H. 2012 Initial spreading of low-viscosity drops on partially wetting surfaces. *Phys. Rev.* E 85 (5), 055301.

XIA, Y., DANIEL, S. & STEEN, P. 2017 Rapidly moving contact lines and damping contributions. *Bull. Am. Phys. Soc.* 62 (14), 177.

YOKOI, K., VADILLO, D., HINCH, J. & HUTCHINGS, I. 2009 Numerical studies of the influence of the dynamic contact angle on a droplet impacting on a dry surface. *Phys. Fluids* 21 (7), 72102.

Illustrative embodiments of the processes, methods, and products of the present disclosure are described herein. It should be understood, however, that the description herein of the specific embodiments is not intended to limit the present disclosure to the particular forms disclosed but, on the contrary, the intention is to cover all modifications equivalents and alternatives falling within the spirit and scope of the invention by the appended claims. Thus, although the present invention has been described for the purpose of illustration, it is understood that such detail is solely for that purpose and variations can be made by those skilled in the art without departing from the spirit and scope of the invention which is defined by the following claims.

What is claimed is:

1. A system for measuring contact-line mobility of a liquid on a solid substrate, wherein said system comprises:
   (a) a motion-generation component comprising an actuator and a controller, wherein:
      (i) said actuator adapted to mount a solid substrate, and effective to impart periodic forcing to the solid substrate when a test droplet of the liquid is deposited thereon; and
      (ii) said controller is adapted to tune frequency and amplitude of the forcing to induce measurable contact-line displacement of the test droplet on the solid substrate;
   (b) a motion-measurement component comprising an image acquisition device adapted for capturing images of the test droplet deposited on the solid substrate before, during or after the forcing imparted by the actuator, said image acquisition device having requisite spatial and temporal resolution to enable acquisition of image data of the test droplet comprising contact-line displacement, contact-line speed, and contact angle at or near contact-line; and
   (c) a computer component adapted to receive and analyze the image data from the motion-measurement component effective to measure the contact-line mobility of the test droplet, wherein the computer component is configured to determine a dimensionless parameter of contact-line mobility of the liquid from the image data, wherein said dimensionless contact-line mobility parameter is Contact-Line Drag Coefficient M, wherein the Contact-Line Drag Coefficient M is determined from the image data by generating a contact-line cyclic diagram comprising a plot of $\eta\Delta\alpha$ versus $\eta\eta'$; wherein $\eta$=contact line displacement, $\eta'$=contact-line speed, and $\Delta\alpha$=contact angle deviation, said contact-line cyclic diagram including an advancing loop A having a linear region A and a receding loop R having a linear region R simultaneously, wherein the Contact-Line Drag Coefficient M is a reciprocal slope of a best fit line through linear region A and linear region R.

2. The system of claim 1, wherein the contact-line cyclic diagram is generated using a contact angle balancing computation comprising minimizing angle $\varphi$ over reference contact angle $\bar{\alpha}$, wherein angle $\varphi$ is the angle between linear region A and linear region R, and wherein reference contact angle $\bar{\alpha}$ is left as a free parameter.

3. The system of claim 1, wherein the motion-generation component is configured to create inertial-capillary motions in bulk accompanied by contact-line motion sufficient to enable contact-line displacement, contact-line speed, and contact angle at or near contact-line to be measured by the motion-measurement component, with requisite spatial and temporal resolution.

4. The system of claim 3, wherein said contact-line motion is periodic motion.

5. The system of claim 1, wherein the motion-generation component is configured to induce periodic forcing of the test droplets by substantially plane-normal motion of the solid substrate.

6. The system of claim 5, wherein the actuator comprises a mechanical shaker device.

7. The system of claim 5, wherein the controller comprises a function generator for controlling plane-normal vibration parameters of the actuator.

8. The system of claim 5, wherein the image acquisition device is adapted for capturing different views of the images of the test droplet, said different views being selected from the group consisting of a top view, a bottom view, a side view, and combination thereof.

9. The system of claim 5, wherein the image acquisition device is a high-speed camera.

10. The system of claim 5 further comprising a liquid dispensing component configured to dispense one or more test droplets onto the solid substrate during functioning of the system.

11. A method for measuring contact-line mobility of a liquid on a solid substrate, said method comprising the steps of:
   (a) subjecting test droplets of the liquid on the solid substrate to periodic forcing to induce measurable contact-line displacement;
   (b) acquiring image data of the test droplets comprising contact-line displacement, contact-line speed, and contact angle at or near contact-line thereof; and
   (c) determining Contact-Line Drag Coefficient M from the image data by generating a contact-line cyclic diagram comprising a plot of $\eta\Delta\alpha$ versus $\eta\bar{\eta}$, wherein $\eta$=contact line displacement, $\dot{\eta}$=contact-line speed, and $\Delta\alpha$=contact angle deviation, said contact-line cyclic diagram including an advancing loop A having a linear region A and a receding loop R having a linear region R simultaneously, wherein the Contact-Line Drag Coefficient M is a reciprocal slope of a best fit line through linear region A and linear region R.

12. The method of claim 11, wherein the contact-line cyclic diagram is generated using a contact angle balancing computation comprising minimizing angle $\varphi$ over reference contact angle $\bar{\alpha}$, wherein angle $\varphi$ is the angle between linear region A and linear region R, and wherein reference contact angle $\bar{\alpha}$ is left as a free parameter.

13. The method of claim 11, wherein the subjecting step (a) comprises subjecting the test droplets on the solid substrate to inertial-capillary motions in bulk, and accompanied by contact-line motion, under conditions sufficient to enable contact-line displacement, contact-line speed, and contact angle at or near contact-line to be measured by an image acquisition device with requisite spatial and temporal resolution.

14. The method of claim 11, wherein the liquid is selected from the group consisting of a blood sample, an ink sample, a drop-on-demand printing liquid sample, a 3D printing liquid sample, an additive doped liquid sample, an immersion lithography liquid sample, a spin-coating liquid sample, a soldering liquid sample, a brazing liquid sample, and a lubricant liquid sample.

15. A method for measuring contact-line mobility of a liquid on a solid substrate, said method comprising the steps of:
  (a) providing a system comprising:
    (i) a motion-generation component comprising an actuator and a controller, wherein said actuator is adapted to mount a solid substrate thereon, and effective to impart periodic forcing to the solid substrate when a test droplet of the liquid is deposited thereon; and said controller is adapted to tune frequency and amplitude of the forcing to induce measurable contact-line displacement of the test droplet on the solid substrate;
    (ii) a motion-measurement component comprising an image acquisition device adapted for capturing images of the test droplet deposited on the solid substrate before, during, or after the forcing imparted by the actuator, said image acquisition device having requisite spatial and temporal resolution to enable acquisition of image data of the test droplet comprising contact-line displacement, contact-line speed, and contact angle at or near contact-line; and
    (iii) a computer component adapted to receive and analyze the image data from the motion-measurement component, and configured to determine a dimensionless parameter of contact-line mobility of the liquid from the image data, wherein said dimensionless contact-line mobility parameter is Contact-Line Drag Coefficient M, wherein the Contact-Line Drag Coefficient M is determined from the image data by generating a contact-line cyclic diagram comprising a plot of $\eta\Delta\alpha$ versus $\eta\eta$; wherein $\eta$=contact line displacement, $\eta'$=contact-line speed, and $\Delta\alpha$=contact angle deviation, said contact-line cyclic diagram including an advancing loop A having a linear region A and a receding loop R having a linear region R simultaneously, wherein the Contact-Line Drag Coefficient M is a reciprocal slope of a best fit line through linear region A and linear region R;
  (b) depositing one or more test droplet of the liquid onto the solid substrate; and
  (c) operating the system in a manner effective to determine the Contact-Line Drag Coefficient M of the liquid.

16. The method of claim 15, wherein the contact-line cyclic diagram is generated using a contact angle balancing computation comprising minimizing angle $\varphi$ over reference contact angle $\bar{\alpha}$, wherein angle $\varphi$ is the angle between linear region A and linear region R, and wherein reference contact angle $\bar{\alpha}$ is left as a free parameter.

17. The method of claim 15, wherein the motion-generation component is configured to create inertial-capillary motions in bulk accompanied by contact-line motion sufficient to enable contact-line displacement, contact-line speed, and contact angle at or near contact-line to be measured by the motion-measurement component, with requisite spatial and temporal resolution.

18. The method of claim 17, wherein said contact-line motion is periodic motion.

19. The method of claim 15, wherein the motion-generation component is configured to induce periodic forcing of the test droplets by substantially plane-normal motion of the solid substrate.

20. The method of claim 15, wherein the actuator comprises a mechanical shaker device.

21. The method of claim 15, wherein the controller comprises a function generator for controlling plane-normal vibration parameters of the actuator.

22. The method of claim 15, wherein the image acquisition device is adapted for capturing different views of the images of the test droplet, said different views being selected from the group consisting of a top view, a bottom view, a side view, and combination thereof.

23. The method of claim 15, wherein the image acquisition device is a high-speed camera.

24. The method of claim 15, wherein the one or more test droplet is dispensed onto the solid substrate by a liquid dispensing component of the system.

25. The method of claim 15, wherein the liquid is selected from the group consisting of a blood sample, an ink sample, a drop-on-demand printing liquid sample, a 3D printing liquid sample, an additive doped liquid sample, an immersion lithography liquid sample, a spin-coating liquid sample, a soldering liquid sample, a brazing liquid sample, and a lubricant liquid sample.

* * * * *